US008825558B2

(12) United States Patent  (10) Patent No.: US 8,825,558 B2
Parikh et al.  (45) Date of Patent: Sep. 2, 2014

(54) SYSTEM AND METHOD FOR QUALITY CONTROL IN A HIGH VOLUME TALENT ACQUISITION

(75) Inventors: Ajay Anantkumar Parikh, Bangalore (IN); Padmini Mani Giri, Bangalore (IN); Moumita C Bhattacharya, Bangalore (IN); Sonali Garg, Secunderabad (IN); Swati Bhalla, Bangalore (IN)

(73) Assignee: Wipro Limited, Bangalore (IN)

( * ) Notice: Subject to any disclaimer, the term of this patent is extended or adjusted under 35 U.S.C. 154(b) by 518 days.

(21) Appl. No.: 12/901,584

(22) Filed: Oct. 11, 2010

(65) Prior Publication Data
US 2012/0089528 A1  Apr. 12, 2012

(51) Int. Cl.
G06Q 10/00 (2012.01)
G06Q 10/10 (2012.01)

(52) U.S. Cl.
CPC .................................. G06Q 10/1053 (2013.01)
USPC .......................................... 705/321; 705/318

(58) Field of Classification Search
CPC .............. G06Q 40/08; G06Q 30/0269; G06Q 20/4016; G06Q 30/0225; G06Q 30/0185; G06Q 50/01; G06Q 10/1053
USPC .............................................. 705/1, 320, 321
See application file for complete search history.

(56) References Cited

U.S. PATENT DOCUMENTS

| 7,502,804 | B2 | 3/2009 | Cohen |
| 2001/0047347 | A1 | 11/2001 | Perell et al. |
| 2002/0046075 | A1* | 4/2002 | Gangopadhyay et al. ........ 705/8 |
| 2002/0183949 | A1* | 12/2002 | Chen et al. ...................... 702/83 |
| 2003/0120531 | A1 | 6/2003 | Parker |
| 2004/0093263 | A1* | 5/2004 | Doraisamy et al. ............. 705/11 |
| 2005/0165797 | A1* | 7/2005 | Nair .............................. 707/100 |
| 2006/0047530 | A1 | 3/2006 | So et al. |
| 2006/0287970 | A1* | 12/2006 | Chess et al. ....................... 707/1 |
| 2008/0155686 | A1 | 6/2008 | McNair |
| 2009/0327006 | A1 | 12/2009 | Hansan et al. |

FOREIGN PATENT DOCUMENTS

WO  2005026899 A2  3/2005

* cited by examiner

*Primary Examiner* — Gabrielle McCormick
(74) *Attorney, Agent, or Firm* — LeClairRyan, a Professional Corporation

(57) ABSTRACT

A system and method for quality control in a high volume talent acquisition is disclosed. In one embodiment, a system for quality control in a high volume talent acquisition includes a processor, a quality talent acquisition database for storing a plurality of candidate e-dossiers and historical data associated with fraudulent practices used in the talent acquisition, memory operatively coupled to the processor and the quality talent acquisition database, and a quality talent acquisition module communicatively coupled to the processor and the quality talent acquisition database. The quality talent acquisition module includes a selection module for selecting one or more prospective candidates from the plurality of candidate e-dossiers, a fraud and non-compliance module for obtaining information associated with fraudulent practices, an e-dossier compilation module for compiling the candidate e-dossiers and a sampling module for sampling on a real-time basis the selected one or more candidates.

39 Claims, 21 Drawing Sheets

FIG. 5

| RESUME NUMBER | CANDIDATE NAME | JOB CODE | PAS/PLAN NO. | STATUS | DIVISION | SUB DIVISION | LR NAME | TQGR NAME | ACTION |
|---|---|---|---|---|---|---|---|---|---|
| 2065123 | NEEL KAMAL | 75687 | PA-159946 | FITMENT | BUSINESS TECHNOLOGY SERVICES - FS AND TMT | DATA WAREHOUSE AND BUSINESS INTELLIGENCE | MITHUN JAGADEV | MOUMITA C BHATTACHARYA | VERIFY/APPROVE CHECKLIST |

T201 CHECKLIST

TOTAL RECORDS : 1    RECORDS DISPLAYED : 1 - 1    GO TO : 1

FIG. 6

| DEPT. OWNING THE DOC. | TA, TQA ORGANIZATION | REGION DOC. APPLICABLE TO | RECRUITMENT OFFSHORE (INDIA) | DOC. TYPE | TEMPLATE |
|---|---|---|---|---|---|
| DOC. LEVEL | LEVEL 3 | LOCATION APPLICABLE TO | ALL OFFSHORE LOCATIONS | FREQUENCY OF AUDIT | MONTHLY / QUARTERLY |
| DOCUMENT RECIPIENT | LINE RECRUITER | DOCUMENT OWNER | TQA | PROCESS APPLICABLE TO | TQG |
| DOC. DISTRIBUTION LIST (DEPTS) | TQA,TQR,CBVT,TQG AUDIT,LR DRM EMPLOYEE RECORD | | | | |

RESUME DETAILS

| CANDIDATE INFORMATION | | | | | |
|---|---|---|---|---|---|
| RESUME NUMBER | 2065123 | CANDIDATE NAME | NEEL KAMAL | | VIEW RESUME DETAILS |
| REQUIREMENT INFORMATION | | | | | |
| JOB CODE | 75687 | DIVISION/SUB-DIVISION | BUSINESS TECHNOLOGY SERVICES - FS AND TMT / DATA WAREHOUSE AND BUSINESS INTELLIGENCE | | VIEW JOB DETAILS |
| TQG EVALUATION INFORMATION | | | | | |
| TQA NAME | MOUMITA C BHATTACHARYA | TQA LINE RECRUITER NAME | MITHUN JAGADEV | | |
| INTERVIEW TYPE | FIRST TECHNICAL INTERVIEW | BAND OF PANEL | GROUP D1 | E-MAIL ID OF PANEL | SIVAKUMAR.KRISHNAMURTHY @ABC.COM |
| INTERVIEW TYPE | HR INTERVIEW | BAND OF PANEL | GROUP B1 | E-MAIL ID OF PANEL | MITHUN.JAGADEV@ABC.C OM |
| DOCUMENT LINKS | VIEW TQA T101 CHECKLIST | VIEW LR-T101 CHECKLIST | VIEW FILMENT | CANDIDATE STATUS | VIEW T201 CHECKLIST |

EVALUATION

| SL. NO. | DOCUMENTS | LINE ITEM | STATUS | FINAL DESCRIPTION OF EXPOSURE | DEFAULT SEVERITY | | FINAL SEVERITY |
|---|---|---|---|---|---|---|---|
| 15 | 10TH,12TH,GRADUATION/ POSTGRADUATION/PHD/DIPLOMA | | | | | | |
| 15.1 | | CHECK FOR GAPS IN EDUCATION | | 3 YEARS GAP BETWEEN 12TH AND BE | NO | | 3 |

OVERALL COMMENTS

OVERALL CLARIFICATION COMMENTS

[SEEK CLARIFICATION] — 702    [APPROVE] — 704    [REJECT] — 706    [RESET] — 708    [HARD CLOSURE] — 710

VIEW ALL TQG COMMENTS

FIG. 7

TQG HARD CLOSURE T205

| | | | |
|---|---|---|---|
| NAME OF CANDIDATE | DHIREN SARMA | RESUME NO. | 2065754 |
| DIVISION | TESTING SERVICES | SKILL | NICHE-TECHNICAL |
| CURRENT ORG. | XYZ | TOTAL EXP(IN MONTHS) | 133 |
| LR NAME | TRUSHNA VENI | TQGR NAME | RAGHAVENDRA RAJENDRA KAVI |
| VIEW T201 CHECKLIST | VIEW LR-T101 CHECKLIST | VIEW RESUME DETAILS | CANDIDATE STATUS |
| NO. OF EMPLOYMENT | 11 | | |
| GAPS DURING EDUCATION | YES | | |
| GAPS DURING EMPLOYMENT | YES | | |
| GAPS IF ANY | 1. GAPS IN EDUCATION A) GAP BETWEEN 10TH AND 12TH. 2. GAPS IN EMPLOYMENT A) 4 YRS IMMEDIATELY AFTER EDUCATION B) A YR BETWEEN THIRD EYE 1ST COMPANY AND 2ND COMPANY C)7 MONTHS BETWEEN EPSILON SOLUTIONS AND ZENSAR | | |
| REASONS FOR THE GAP | 1. GAPS IN EDUCATION A) GAP BETWEEN 10TH AND 12TH. 2. GAPS IN EMPLOYMENT A) 4 YRS IMMEDIATELY AFTER EDUCATION B) A YR BETWEEN THIRD EYE FOR GAP IN EMPLOYMENT A) FOR 4 YRS HE DID ATTEND SOME COMPUTER COURSES FROM SMALL INSTITUTES FROM GAUHATI FOR WHICH HE DINT EVEN GET ANY CERTIFICATE AND ALSO DURING THAT TIME HE WAS LOOKING FOR JOB. B) IN DEC 97, HE CAME DOWN TO PUNE AND STARTED SEARCHING FOR JOB AGAIN AND ALSO WAS DOING SOME COURSES. HE DOESN'T HAVE CERTIFICATES FOR THIS TOO. C) WHILE WORKING WITH EPSILON, THE COMPANY COULD NOT SURVIVE AND HENCE GET CLOSED. HE WAS LOOKING FOR JOB DURING THAT TIME AS WELL. | | |
| OBSERVATIONS BY TQGR | GAPS IN EDUCATION AND EMPLOYMENT | | |
| EXPLANATION BY CANDIDATE LINE RECRUITER | REASONS ARE MENTIONED ABOVE | | |
| DESCRIPTION OF EXPOSURE | GAPS IN EDUCATION AND EMPLOYMENT | | |
| OBSERVATIONS FROM TQGR | SENDING THE CLARIFICATIONS ON MAIL TOO | | |
| RECOMMENDATIONS FROM TOGH | | | |

[APPROVE] 902 [REJECT] 904 [TALENT ACQUISITION HEAD APPROVAL] 906 [TALENT QUALITY OPERATIONS HEAD APPROVAL] 908

FIG. 9

| | DOCUMENT CHECKLIST - T101 | | |
|---|---|---|---|
| | TA/IQG/TQA/TMP/L3/DC/T101/V 2.0/REL 14002009 | | |
| DEPT. OWNING THE DOC | TALENT ACQUISITION (TA), TALENT QUALITY ASSOCIATE (TQA) ORGANISATION | DOC TYPE | TEMPLATE |
| REGION DOC APPLICABLE TO | LATERAL RECRUITMENT OFFSHORE (INDIA) | DOC LEVEL | LEVEL 3 |
| PROGRAM OF THIS DOC IS APPLICABLE TO | TALENT QUALITY GROUP (TQG) | FREQ OF AUDIT | MONTHLY / QUARTERLY |
| DOC DISTRIBUTION LIST (DEPTS) | TQG, TQG RECRUITER (TQGR), CBVT, TQG AUDIT, LINE RECRUITER (LR), DIVISIONAL RESOURCE MANAGER (DRM), EMPLOYEE RECORD | LOCATION DOC APPLICABLE TO | ALL OFFSHORE LOCATIONS |
| DOCUMENT OWNER | TQA/LR | DOCUMENT RECEPIENT | LINE RECRUITER |
| RESUME/DOSSIER NO | | DIVISION | |
| CANDIDATES NAME | | SUB DIVISION | |
| CANDIDATE LOCATION | | DATE OF DOCUMENTS RECEIVED FROM CANDIDATE | |
| LINE RECRUITER NAME | | HR INTERVIEWER NAME | |
| TQA NAME | | HR INTERVIEWER LOCATION | |
| TQA/LR LOCATION | | HR INTERVIEW DATE | |

| SL.NO. | MANDATORY DOCUMENT CHECK - TO BE FILLED BY TALENT QUALITY ASSOCIATE (TQA)/LINE RECRUITER (LR) (SECTION A) | STATUS |
|---|---|---|
| 1 | COMPANY APPLICATION FORM - CHECK FOR COMPLETELY FILLED FROM WITH SIGNATURE OF THE CANDIDATE | YES ☐   NO ☐ |
| 2 | PASSPORT SIZE PHOTOGRAPHS (LATEST) - 2 | YES ☐   NO ☐ |
| 3 | ONE FORM 16/BANK STATEMENT/PF STATEMENTS FOR EVERY EMPLOYMENT IN THE LAST 5 YEARS OR 2 EMPLOYMENTS WHICHEVER IS HIGHER OR TAX STATEMENTS (IF WORKING ABROAD) - PHOTOCOPY | YES ☐   NO ☐   NA ☐ |
| 4 | PERMANENT ACCOUNT NUMBER (PAN) CARD / ACKNOWLEDGEMENT OF APPLICATION - PHOTOCOPY | YES ☐   NO ☐ |
| 5 | PRESENT EMP - PAY SLIP FOR LAST 3 MONTHS (IF EMPLOYMENT IS MORE THAN 3 MONTHS) - PHOTOCOPY | YES ☐   NO ☐ |
| 6 | PRESENT EMP - HIKE LETTER (S) / APPOINTMENT LETTER (WHICHEVER IS LATEST - PHOTOCOPY) | YES ☐   NO ☐   NA ☐ |
| 7 | PRESENT EMP – IDENTIFIER (ID) CARD - PHOTOCOPY | YES ☐   NO ☐   NA ☐ |
| 8 | PRESENT EMP - RELIEVING LETTER (IF ALREADY QUIT) - PHOTOCOPY | YES ☐   NO ☐   NA ☐ |
| 9 | PREVIOUS EMP - OFFER LETTERS / APPOINTMENT LETTERS - (ONLY IF MODE OF SALARY CASH/CHEQUE) - PHOTOCOPY | YES ☐   NO ☐   NA ☐ |
| 10 | PREVIOUS EMP - RELIEVING LETTERS / EXPERIENCE LETTERS WITH DOJ &DOR - PHOTOCOPY | YES ☐   NO ☐   NA ☐ |
| 11 | PASSPORT PHOTO COPY WITH ALL THE VISA STAMPING & ENCR PAGES / ACKNOWLEDGMENT OF APPLICATION | YES ☐   NO ☐   NA ☐ |
| 12 | ALL EDUCATION MARK SHEETS 10TH ONWARDS - PHOTOCOPY | 10TH ☐   12TH ☐   DIPLOMA ☐ |
| 13 | DATE OF FINAL FACE TO FACE TECHNICAL INTERVIEW | GRADUATION ☐   PG ☐ |

| SL.NO. | MANDATORY CHECKS - TO BE FILLED BY LINE RECRUITER (SECTION B) | STATUS |
|---|---|---|
| I. | EX - EMPLOYEE | YES ☐   NO ☐ |
| II. | DO NOT HIRE (DNH) COMPANY (ALL EMPLOYMENTS) | YES ☐   NO ☐ |
| II.A. | DATE OF RELEASE OF THE DNH COMPANY LIST | |
| III. | DNH UNIVERSITY | YES ☐   NO ☐ |
| III.A. | DATE OF RELEASE OF THE DNH UNIVERSITY LIST | |
| IV. | NO POACH COMPANY (PRESENT EMPLOYMENT) | YES ☐   NO ☐   EXCEPTION ☐ |
| IV.A. | DATE OF RELEASE OF THE NO-POACH COMPANY | |
| V | ROC + VC CHECK FOR 2 EMPLOYMENTS OR 5 YRS WHICHEVER IS HIGHER | YES ☐   NO ☐ |
| VI | TECHNICAL ASSESSMENT FORM (TAF) 1 IN SYNERGY | YES ☐   NO ☐ |
| VII | TAF 2 IN SYNERGY | YES ☐   NO ☐   NA ☐ |
| VIII | ORIGINAL HANDWRITTEN TAF INCASE OF WALK IN | YES ☐   NO ☐   NA ☐ |
| IX | CURRICULUM VITTAE (CV) (*RESUME SCREEN OF SYNERGY) | YES ☐   NO ☐ |
| X | CV - LATEST (IF WALK-IN CV COPY STAMPED AT WALK-IN VENUE) | YES ☐   NO ☐ |
| XI | RELEVANT TECHNICAL CERTIFICATIONS - PHOTOCOPY | YES ☐   NO ☐   NA ☐ |
| XII | E-ASSESSMENT RESULT AND DATE | PASS ☐   FAIL ☐   NA ☐   DATE:.... |

TQA/LR COMMENTS :

DATE :                                    TQA SIGNATURE :

DATE :                                    LINE RECRUITER SIGNATURE :

FIG. 12

E-DOSSIER EVALUATION CHECKLIST – T201

| DEPT. OWNING THE DOC. | TA, TQA ORGANIZATION | REGION DOC. | RECRUITMENT OFFSHORE (INDIA) | DOC. TYPE | TEMPLATE |
|---|---|---|---|---|---|
| DOC. LEVEL | LEVEL 3 | LOCATION APPLICABLE TO | ALL OFFSHORE LOCATIONS | FREQUENCY OF AUDIT | MONTHLY / QUARTERLY |
| DOCUMENT RECIPIENT | LINE RECRUITER | DOCUMENT OWNER | TQA | PROCESS APPLICABLE TO | TQG |
| DOC. DISTRIBUTION LIST (DEPTS) | TQA,TQR,CBVT,TQG AUDIT,LR DRM,EMPLOYEE RECORD | | | | |

RESUME DETAILS

| CANDIDATE INFORMATION | RESUME NUMBER | 2065123 | CANDIDATE NAME | NEEL KAMAL | VIEW RESUME DETAILS |
|---|---|---|---|---|---|
| REQUIREMENT INFORMATION | JOB CODE | 75687 | DIVISION/SUB- | BUSINESS TECHNOLOGY SERVICES - FS AND TMT / DATA WAREHOUSE AND BUSINESS INTELLIGENCE | VIEW JOB DETAILS |
| TQG EVALUATION INFORMATION | TQA NAME | MOUMITA C | TQA/LINE RECRUITER NAME | MITHUN JAGADEV | |
| INTERVIEW TYPE | FIRST TECHNICAL INTERVIEW | BAND OF PANEL | GROUP D1 | E-MAIL ID OF PANEL | SIVAKUMAR.KRISHNAMURTHY@ABC.COM |
| INTERVIEW TYPE | HR INTERVIEW | BAND OF PANEL | GROUP B1 | E-MAIL ID OF PANEL | MITHUN.JAGADEV@ABC.COM |
| DOCUMENT LINKS | VIEW TQA T101 CHECKLIST | VIEW LR-T101 CHECKLIST | VIEW FILMENT | CANDIDATE STATUS | VIEW T201 CHECKLIST |

EVALUATION

| | LINE ITEM | STATUS | FINAL DESCRIPTION OF EXPOSURE | DEFAULT SEVERITY 1310 | FINAL SEVERITY 1312 |
|---|---|---|---|---|---|
| 1.1 | CHECK FOR ALL DOCS AS PER DOSSIER CHECKLIST | CLICK TO SELECT ▸ | | 1 | 1 |
| 2.1 | SOILS CHECK WITH CV, JC, TAF, FITMENT AND HAF | CLICK TO SELECT ▸ | | 2 | 2 |
| 2.2 | CHECK STREAM OF FITMENT WITH JOB TITLE N JC | CLICK TO SELECT ▸ | | 3 | 3 |
| 2.3 | C LOCATION WITH OFFER LOCATION | CLICK TO SELECT ▸ | | 3 | 3 |

1    E-DOSSIER COMPLETENESS

2    PEOPLE ALLOCATION SYSTEM (PAS) NO./JOB CODE (JC)/JOB DESCRIPTION (JD)

| 3.1 | PRESENT EXPERIENCE CHECK WITH CAN, FITMENT AND HR FACEPLATE | CLICK TO SELECT ▶ | 3 | 3 |
| --- | --- | --- | --- | --- |
| 3.2 | POE (CHECK THE DATE OVERLAP), CAM, FITMENT, TAF1, TAF2 | CLICK TO SELECT ▶ | 2 | 2 |
| 3.3 | RDC CHECK WITH ALL EMPLOYMENT WITJ JOB TITLE | CLICK TO SELECT ▶ | 2 | 2 |
| 3.4 | TECHNICAL CERTIFICATIONS, CHECK WITH CAN & TAF IF REDCONED IN FITMENT AND/OR JD | CLICK TO SELECT ▶ | 3 | 3 |
| 3.5 | OVERSEAS PROJECTS/EXPERIENCE CHECK WITH PASSPORT STAMPING | CLICK TO SELECT ▶ | 3 | 3 |
| 3.6 | CONSTITENCY I HIS CAREER MOVE | CLICK TO SELECT ▶ | 2 | 2 |
| 3.7 | DESIGNATION IN PRESENT ORGANISATION CHECK IN CAM/APPOINTMENT LETTER/INCREMENT LETTER/PAY SLIP | CLICK TO SELECT ▶ | 2 | 2 |
| 3.8 | CHECK CANDIDATE NAME WITH CAM, PASSPORT,PAN, HR FACEPLATE, MARK SHEETS, CERTIFICATES, ID CARD, FORM16, PAYROLLS,APPOINTMENT LETTER | CLICK TO SELECT ▶ | 2 | 2 |
| 3.9 | CHECK CANDIDATE DOC WITH CAN, PASSPORT, PAN, MARK SHEETS, CERTIFICATES | CLICK TO SELECT ▶ | 3 | 3 |
| 3.10 | CHECK HARD COPY CV WITH SYNERGY CV FOR CONSISTENCY | CLICK TO SELECT ▶ | 2 | 2 |
| 3.11 | EDUCATION WITHCAM, FITMENT AND HR FACEPLATE | CLICK TO SELECT ▶ | 3 | 3 |
| 3.12 | PREVIOUS EXPERIENCE CHECK WITH CAM, FITMENT AND HR FACEPLATE | CLICK TO SELECT ▶ | 3 | 3 |

3 CURRICULUM VITTAE

 1300

| 4.1 | FEARS OF EXPERIENCE CHECK WITH CAN, FITMENT VIEW | CLICK TO SELECT ▶ | 3 | 3 |
| --- | --- | --- | --- | --- |
| 4.2 | NAME OF PREVIOUS ORGANISTION CHECK WITH CV, CAM & FITMENT VIEW | CLICK TO SELECT ▶ | 2 | 2 |
| 4.3 | NAME OF PRESENT ORGANISATION CHECK WITH CV, CAM & FITMENT VIEW | CLICK TO SELECT ▶ | 2 | 2 |

4 FACEPLATE (PRE-HR CHECK LIST) (TO BE FILLED BY CONSULTANTS FOR C2 AND ABOVE AND TO BE FILLED BY RECRUITRS FOR ALL THE CV'S SECURED DIRECTLY BY THEM IRRESPECTIVE OF THE BAND OF CANDIDATE)

FIG. 13 (CONT.)

| | | | | | |
|---|---|---|---|---|---|
| 5 | E-ASSESSMENT | 5.1 | SKILLS CHECK WITH CV, CAN, TAF, JC | CLICK TO SELECT | 3 | 3 |
| 6 | TECHNICAL ASSESSMENT FORM (TAF) 1 | 6.1 | CHECK TAF COMMENTS SKILLS WITH JD, CV, CAM AND TAF | CLICK TO SELECT | 2 | 2 |
| | | 6.2 | CHECK TAF SKILLS BOX WITH TAF'S COMMENTS BOX | CLICK TO SELECT | 2 | 2 |
| | | 6.3 | CHECK HARD COPY TAF WITH SYNERGY TAF (IN CASE OF WAK-IN) | CLICK TO SELECT | 3 | 3 |
| | | 6.4 | CHECK IF TAF IS COMPLETE | CLICK TO SELECT | 1 | 1 |
| | | 6.5 | CHECK (TAF SIGNED (IF HARD COPY) CAN, FITMENT AND HR FACEPLATE | CLICK TO SELECT | 1 | 1 |
| | | 6.6 | CHECK IF TECH INTERVIEWER HAS FIELD THE TAF HIMSELF/HERSELF | CLICK TO SELECT | 3 | 3 |
| 7 | TAF 2 | 7.1 | CHECK TAF COMMENTS SKILLS WITH JD, CV, CAM AND HAF | CLICK TO SELECT | 2 | 2 |
| | | 7.2 | CHECK TAF SKILLS BOX WITH TAF'S COMMENTS BOX | CLICK TO SELECT | 2 | 2 |
| | | 7.3 | CHECK IF TAF IS COMPLETE | CLICK TO SELECT | 1 | 1 |
| | | 7.4 | CHECK (TAF SIGNED (IF HARD COPY) | CLICK TO SELECT | 1 | 1 |
| | | 7.5 | CHECK IF TECH INTERVIEWER HAS FIELD THE TAF HIMSELF/HERSELF | CLICK TO SELECT | 3 | 3 |
| 8 | COMPANY APPLICATION FORM(CAM) | 8.1 | CAM DULY FILLED & SIGNED BY THE CANDIDATE | CLICK TO SELECT | 3 | 3 |
| | | 8.2 | PHOTO NOT MATCHING WITH SYNERGY AND OR PASSPORT AND OR CV | CLICK TO SELECT | 3 | 3 |
| | | 8.3 | CHECK PERIOD OF EMPLOYMENT FOR DATE OVERLAP | CLICK TO SELECT | 3 | 3 |
| | | 8.4 | CHECK SALARY WITH APPOINTMENT LETTER PAYROLL, FORM 16/SARAL FORM, HR FACEPLATE AND FITMENT VIEW | CLICK TO SELECT | 3 | 3 |
| | | 8.5 | CHECK SALARY WITH FITMENT VIEW | CLICK TO SELECT | 3 | 3 |

| | | | | |
|---|---|---|---|---|
| 9 | FORM 16 / SARAL FORM | 9.1 | CHECK EMPLOYEE CODE WITH CAM AND SALARY SLIP/EXPERIENCE OR RELIEVING LETTER | CLICK TO SELECT ▶ | | |
| | | 9.2 | COMPANY NAME AND ADDRESS TO BE CHECKED / CHECK TAN NO FROM IT WEBSITE | CLICK TO SELECT ▶ | 3 | 3 |
| | | 9.3 | CHECK PAN NUMBER WITH PAN CARD LATEST PAY SLIP | CLICK TO SELECT ▶ | 4 | 4 |
| 10 | PAN CARD | 10.1 | CHECK CONSISTENCY OF SIGNATURE IN CAM, PAN AND PASSPORT | CLICK TO SELECT ▶ | 2 | 2 |
| | | 10.2 | CHECK DATE OF BIRTH WITH CAM, CV, 10TH MARKSHEET, LATEST PAYROLL AND PASSPORT | CLICK TO SELECT ▶ | 2 | 2 |
| 11 | PAYROLL / SALARY PROOF / HIKE LETTER / APPOINTMENT LETTER | 11.1 | CHECK COMPANY NAME WITH CAM AND CV | CLICK TO SELECT ▶ | 2 | 2 |
| | | 11.2 | CHECK LOGO SETTING WITH OFFER LETTER | CLICK TO SELECT ▶ | 3 | 3 |
| | | 11.3 | CHECK MONTH - SHOULD BE LAST 3 MONTHS | CLICK TO SELECT ▶ | 1 | 1 |
| | | 11.4 | CHECK DATE OF JOINING WITH CAN COMMENTS BOX | CLICK TO SELECT ▶ | 2 | 2 |
| | | 11.5 | CHECK THE HIKE WITH THE FIGURE IN CAM AND PAY SLIP | CLICK TO SELECT ▶ | 2 | 2 |
| | | 11.6 | SIGNATORY CHECK FOR CONSISTENCY (NAME,DESIGNATION AND SIGNATORY) | CLICK TO SELECT ▶ | 3 | 3 |
| | | 11.7 | CHECK FOR IT, PT AND PF DEDUCTIONS AGAINST PAY SLIP | CLICK TO SELECT ▶ | 3 | 3 |
| | | 11.8 | CHECK CANDIDATE NAME WITH CAM, PASSPORT, PAN, MARK SHEETS | CLICK TO SELECT ▶ | 3 | 3 |
| | | 11.9 | CHECK BANK NAME AND A/C NUMBER WITH BANK STATEMENT | CLICK TO SELECT ▶ | 3 | 3 |
| | | 11.10 | CHECK FIGURES, WORDS AND ADDITIONS IN PAYROLL, BANK STATEMENT AND FORM 16 | CLICK TO SELECT ▶ | 3 | 3 |
| | | 11.11 | REGISTERED ADDRESS OF OUTMENT EMPLOYER WITH ROC AND COMPANY WEBSITE | CLICK TO SELECT ▶ | 2 | 2 |
| 12 | IDENTIFIER (ID) CARD | 12.1 | CHECK THE EMPLOYMENT NUMBER WITH PAYROLL, FORM 16, IT STATEMTN AND CM | CLICK TO SELECT ▶ | 3 | 3 |
| 13 | RELIEVING AND EXPERIENCE LETTER OF PREVIOUS ORGANISATION | 13.1 | CHECK PDE WITH CAM, CV AND CHECK FOR OVERLAP DATE | CLICK TO SELECT ▶ | 2 | 2 |
| 14 | PASSPORT(S) | 14.1 | CHECK FOR NATIONALITY, IF OTHER NATIONAL CHECK FOR WORK PERMIT | CLICK TO SELECT ▶ | 3 | 3 |

FIG. 13 (CONT.)

| | | | | |
|---|---|---|---|---|
| 15 | 10TH,12TH,GRADUATION/ POST GRADUATION/PHD/ DIPLOMA | 15.1 | CHECK FOR GRADUATION DEGREE WITH CAM, CV AND FITMENT VIEW RELIEVING LETTER | CLICK TO SELECT ▸ | 3 | 3 |
| | | 15.2 | CHECK FOR ALL %S WITH CAM | CLICK TO SELECT ▸ | 2 | 2 |
| | | 15.3 | CHECK FOR ALL YERS OF PASSING WITH CAM AND CV | CLICK TO SELECT ▸ | 3 | 3 |
| | | 15.4 | CHECK ALL UNIVERSITY NAMES WITH CAM AND CV | CLICK TO SELECT ▸ | 3 | 3 |
| | | 15.5 | CHECK FOR GAPS IN EDUCATION | CLICK TO SELECT ▸ | 3 | 3 |
| 16 | HUMAN RESOURCE ASSESSMENT FORM (HAF) 1 | 16.1 | CHECK BAND WITH FITMENT VIEW (MISMATCH NOT SUPPORTED BY APPROVAL) RELIEVING LETTER | CLICK TO SELECT ▸ | 3 | 3 |
| | | 16.2 | CHECK IF HR INTERVIEWER'S BAND IS AS PER THE POLICY GUIDELINES | CLICK TO SELECT ▸ | 4 | 4 |
| | | 16.3 | CHECK IF HR INTERVIEWER HAS FAILED THE HAF HIMSELF/HERSELF | CLICK TO SELECT ▸ | 3 | 3 |
| 17 | HAF 2 | 17.1 | CHECK BAND WITH FITMENT VIEW (MISMATCH NOT SUPPORTED BY APPROVAL) RELIEVING LETTER | CLICK TO SELECT ▸ | 3 | 3 |
| | | 17.2 | CHECK IF HR INTERVIEWER'S BAND IS AS PER THE POLICY GUIDELINES | CLICK TO SELECT ▸ | 4 | 4 |
| | | 17.3 | CHECK IF HR INTERVIEWER HAS FAILED THE HAF HIMSELF/HERSELF | CLICK TO SELECT ▸ | 3 | 3 |
| 18 | FITMENT | 18.1 | CHECK PAS WORK LOCATION | CLICK TO SELECT ▸ | 3 | 3 |
| | | 18.2 | CHECK ON CURRENT COMPANY NAME, DESIGNATION, SALARY & EXPERIENCE AGAINST CV, CAN, HAF & TAF | CLICK TO SELECT ▸ | 3 | 3 |
| | | 18.3 | CHECK BAND WITH PAS #/DC/JD DOCUMENT | CLICK TO SELECT ▸ | 2 | 2 |
| | | 18.4 | CHECK RELEVANT YRS OF EXP CONSISTENT OF HAF TAF CV & CAM | CLICK TO SELECT ▸ | 3 | 3 |
| | | 18.5 | CHECK FITMENT RANGE FOR TAF RATING, SKILL CLASSIFICATION, TIER CLASSIFICATION SALARY OFFERED | CLICK TO SELECT ▸ | 3 | 3 |

FIG. 13 (CONT.)

| | | | | |
|---|---|---|---|---|
| 19 | POLICY AND PROCESS | | | |
| | 19.1 | CHECK FOR ABNORMALLY LESS CYCLE TIME. (REFER VIEW HISTORY SHEET.) | CLICK TO SELECT ▾ | 2 | 2 |
| | 19.2 | CHECK SCREENING PANEL NAMES AGAINST ER NAME | CLICK TO SELECT ▾ | 3 | 3 |
| | 19.3 | CHECK TECH PANEL NAMES AGAINST ER NAME | CLICK TO SELECT ▾ | 4 | 4 |
| | 19.4 | CHECK TECH INTERVIEW HAPPENED BEFORE HR INTERVIEW. | CLICK TO SELECT ▾ | 4 | 4 |
| | 19.5 | MULTIPLE POSTINGS IN SYNERGY, CHECK FOR CONSISTENCY OF ALL CVS AND ALSO IF THE FIRST POSSED CV IS PROCEED | CLICK TO SELECT ▾ | 3 | 3 |
| | 19.6 | EDUCATION CHECK W/THLIST OF BL UNIV (NAME, DESIGNATION AND SIGNATORY) | CLICK TO SELECT ▾ | 4 | 4 |
| | 19.7 | CURRENT COMPANY ANY FROM THE LIST OF POUCH COMPANIES | CLICK TO SELECT ▾ | 4 | 4 |
| | 19.8 | CHECK E-ASSESSMENT SCORE FOR PASS/FAIL | CLICK TO SELECT ▾ | 4 | 4 |
| | 19.9 | CHECK E-ASSESSMENT HAPPENED BEFORE_TECH AND HR INTERVIEW. (REFER T0014-15 B-12) | CLICK TO SELECT ▾ | 3 | 3 |
| | 19.10 | CHECK FOR FACE TO FACE/V PHONE/V CON I/V UNDER NODE OF I/V FOR TECH INTV. | CLICK TO SELECT ▾ | 4 | 4 |
| | 19.11 | TECH PANEL FOR BAND CL AND ABOVE & RELEVANCE | CLICK TO SELECT ▾ | 4 | 4 |
| | 19.12 | CHECK TECH PANEL FOR ICP CERTIFICATION FOR C1 AND C2 | CLICK TO SELECT ▾ | 4 | 4 |
| | 19.13 | CHECK FOR ROC STATUS OF EMPLOYMENTS FOR LAST 5 YRS OR 2 EMPLOYMENT WHICHEVER IS HIGHER. IF ROC -VE THEN DRM APPROVAL MAIL. | CLICK TO SELECT ▾ | 1 | 1 |
| | 19.14 | PANEL BAND SHOULD BE SAME OR HIGHER CANDIDATE BAND | CLICK TO SELECT ▾ | 4 | 4 |

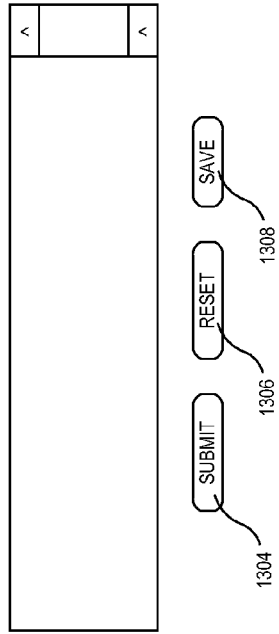

| 19.15 | IF EX-WIPRO/TE CHECK FOR MAIL FROM TED FOR CLEAN EXIT | CLICK TO SELECT ▶ | | 4 | 4 |
| --- | --- | --- | --- | --- | --- |
| 19.16 | CHECK ENTIRE EMPLOYMENT HISTORY FOR DNH COMPANIES | CLICK TO SELECT ▶ | | 4 | 4 |
| 19.17 | CHECK IF THE CANDIDATE HAS MENTIONED ANY KIND OF CRIMINAL OFFENSE HISTORY | CLICK TO SELECT ▶ | | 4 | 4 |
| 19.18 | IF ANY RELATIVE/FRIEND WORK IN WIPRO THEN CHECK IF HE/SHE IS THE RECRUITER, SCREENING PANE, TECH PANEL, HR PANEL. | CLICK TO SELECT ▶ | | 4 | 4 |
| 19.19 | DATE ON WHICH CAN WAS FILLED <=HR INTERVIEW DATE. | CLICK TO SELECT ▶ | | 3 | 3 |
| 19.20 | HR INTERVIEW HAPPNED WITH ALL MANDATORY DOCUMENTS. (REFER T001 & T002) | CLICK TO SELECT ▶ | | 3 | 3 |
| 19.21 | CHECK HR INTERVIEWER BAND WITH CANDIDATE OFFERED BAND | CLICK TO SELECT ▶ | | 4 | 4 |
| 19.22 | CHECK MODE OR HR IV - FACE TO FACE / VCON/V PHONE | CLICK TO SELECT ▶ | | 4 | 4 |
| 19.23 | CHECK IF UNDER GRADUATE, TQG HEAD APPROVAL TO BE ATTACHED | CLICK TO SELECT ▶ | | 4 | 4 |
| 19.25 | CHECK IF SALARY OFFERED IS OVER AND ABOVE THE BINS THEN TED APPROVAL IS MANDATORY | CLICK TO SELECT ▶ | | 4 | 4 |
| 19.26 | HR INTERVIEWER AND THE TQG RECRUITER ARE NOT THE SAME | CLICK TO SELECT ▶ | | 4 | 4 |
| 19.27 | GAP IN TECH AND HR INTERVIEW =<30 DAYS | CLICK TO SELECT ▶ | | 3 | 3 |

1300

OVERALL CLARIFICATION COMMENTS 1302

OVERALL COMMENTS

SUBMIT 1304    RESET 1306    SAVE 1308

FIG. 13 (CONT.)

SYSTEM AND METHOD FOR QUALITY CONTROL IN A HIGH VOLUME TALENT ACQUISITION

BACKGROUND

Typically, in a job hiring process of an organization, some of the major steps involved include skills matching, verification of information provided by candidates, evaluation of the candidates, fitment, sending a job offer, and so on. Almost all of these steps are performed by human resource (HR) department in an organization. At different stages in the job hiring process, verification of information performed by the HR may include verifying personal details, such as address, proof of identity (for example, passport, license, permanent account number (PAN) and the like), educational background, employment details and financial information (for example, prior earnings, prior taxable income and the like), demography and so on. If the verification is successful, a job offer may be extended by the HR to a prospective candidate. In some instances, such verification of information provided by the candidates may be outsourced to a third party specialized in providing such services before extending a job offer to the candidate. Today's hiring processes are manual in nature and can be error prone and very time consuming.

During the job hiring process, to obtain a job offer, some of the prospective candidates may provide incorrect or fraudulent information related to respective personal information and proof of identity, prior educational qualifications, prior employment history/details, and financial information. Further, a prospective candidate may collude with HR personnel or interviewer in the organization for obtaining the job offer. Furthermore, prospective candidates applying for a job coming from certain geographical locations, schools, and so on may tend to provide more fraudulent information related to their respective academic qualifications and prior employment history/details. In addition, a trusted human resource's supply vendor, a trusted verification service provider can deceive the organization with false prospective candidate profiles. An employee of the organization may also refer false prospective candidate profiles to the organization. Moreover, the HR may not comply with certain internal processes of the organization, guidelines, policies, rules and so on in the process of hiring. In addition, the HR and/or an employee can provide fraudulent information about prospective candidates.

In a high quality and high volume job hiring environment where a large number of applicants (10,000 to 50,000 and more in a quarter) have to be screened, such manual verification of information provided by the prospective candidates and the HR as described above can be a very tedious and time consuming. Further, identifying all possibilities of fraudulent practices, such as collusion with the HR, deception from service providers, employee referrals, human resource suppliers, and the like can be practically impossible in the high volume job hiring process. Any delays in such manual verification process can result in prospective candidates getting hired by other competitive organizations, which can result in a loss to the organization as it can affect growth, profitability, relationship with customer and culture of the organization.

Furthermore, the verification of fraudulent practices can be even more difficult where rapid job hiring is required, which has increased pressure on faster fulfillment of resource requirements with quality candidates, where candidates coming from different geographies of the world are to be screened, with emerging market paradigms and time constraints. Moreover, in such an international scenario, verifying employment and educational background information, performance, training, financial information, legal documents/visas and so on can be extremely time consuming and difficult. In addition, in such a scenario, effective communication, integrity, information updation by the recruiters, data sharing and data consistency among the hiring managers, recruiting staff and candidates can be a significant challenge as well. Increased global competition and shrinking window of opportunities can further make it difficult to hire quality candidates rapidly in a timely manner.

Also, verification of compliance with internal processes, guidelines, policies, rules etc. by the HR personnel in the high volume job hiring process can be significantly difficult and impractical. Since most recruiters do not get enough time to verify such information, an unqualified candidate can often get hired, which may result in a significant loss to the organization.

The existing tools for automated screening of resumes/candidates tend to concentrate more on extracting information from the resumes and matching specified skills with the requirements of a particular position in a job hiring scenario. These tools may lack in assisting in real time verification of whether the skills or other personal, educational, employment and financial information provided in the resume or by the candidates during the job hiring process are true, the collusion with the HR, and the deception from service providers, employee referrals, human resource suppliers and the like. This problem can be further compounded due to unavailability of comprehensive external authentic verification sources.

Furthermore, existing manual job hiring processes may lack ability to assess trends and patterns in the job hiring that may not be visible at an individual transaction level. Also, the existing manual hiring processes may lack ability to interface with other organizations and address industry level talent requirement issues. In addition, the existing manual hiring processes may lack ability to assess and audit recruitment policies and procedures objectively and provide a platform for change/improvement. Moreover, the existing hiring processes may lack an integrated platform that integrates hiring practices, learning and feedback on quality of job hiring across the complete recruitment cycle and that can provide timely needed feedback to the stakeholders.

Further, the existing solutions do not provide an integrated dashboard that can bring all recruiters on a same page to monitor and control possible sources of fraud and to know current aggregate quality status of past recruitments, i.e., to obtain a snap shot of past fraudulent practices of recruiters and candidates. In addition, existing solutions do not address time constraint issues in timely hiring of quality candidates, supply demand gap due to less number of availability of suitable candidates and resources, correct fitment of skills, roles and salary, complexity in number of sources of information and amount of information about a candidate and environment, and potential for external and internal fraudulent information about prospective candidates.

BRIEF DESCRIPTION OF THE DRAWINGS

Various embodiments are described herein with reference to the drawings, wherein:

FIGS. 2 through 5 illustrate screenshots showing sampling one or more candidates using an input and trigger based statistical algorithm for fraudulent practices, according to one embodiment;

FIG. 6 illustrates a screenshot showing process used by a quality talent acquisition module to accept or reject a prospective candidate, according to an embodiment;

FIG. 7 illustrates a screenshot showing details associated with a sampled candidate e-dossier and interview details, according to one embodiment;

FIG. 9 illustrates a screenshot showing academic and employment gaps of a prospective candidate that are identified by the quality talent acquisition module, accordingly to one embodiment;

FIG. 12 illustrates a document checklist T101, according to one embodiment;

FIG. 13 illustrates an e-dossier evaluation checklist T201, according to one embodiment;

The drawings described herein are for illustration purposes only and are not intended to limit the scope of the present disclosure in any way.

DETAILED DESCRIPTION

A system and method for quality control in a high volume talent acquisition is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

In the document, 'talent quality group (TQG)' refers to a talent acquisition (TA) team and includes talent quality recruiters, TQG associates (TQA), TQG executives, source due diligence team, background verification team, on boarding team and partner management who are involved in hiring potential employees for an organization. Also, the terms 'high volume talent acquisition' and 'high volume job hiring' are used interchangeably throughout the document.

Figure 1:
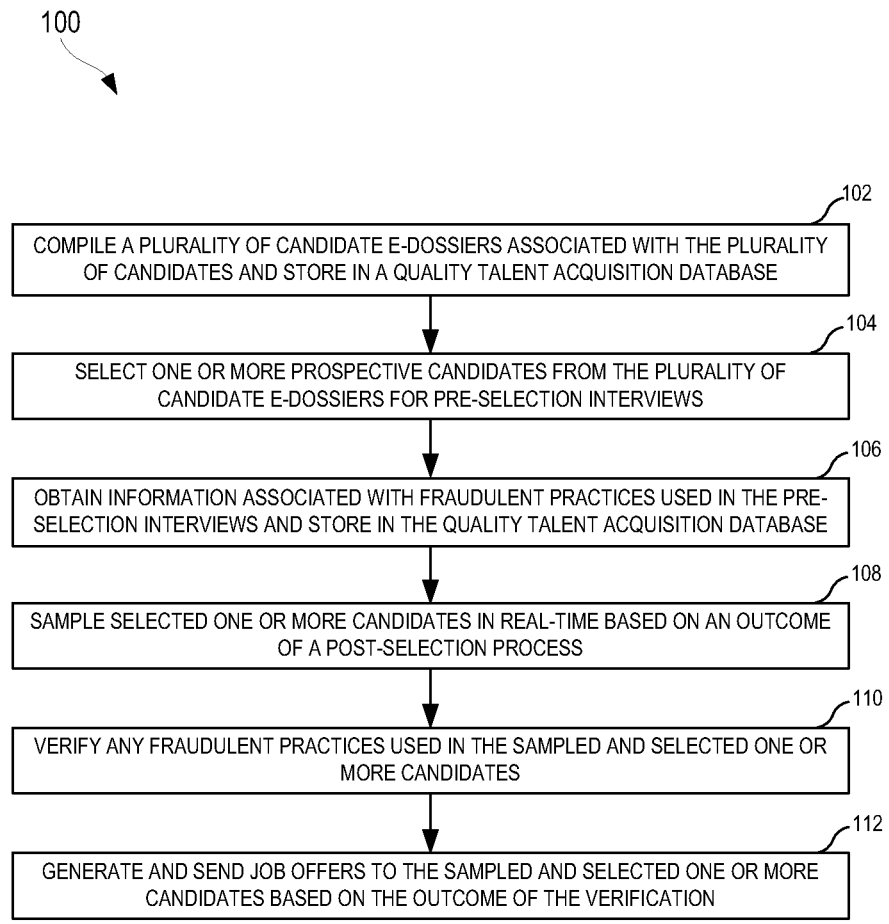
FIG. 1 illustrates a processor-implemented flow diagram of an exemplary method for quality control in a high volume talent acquisition, according to one embodiment.

FIG. 1 illustrates a processor-implemented flow diagram of an exemplary method 100 for quality control in a high volume talent acquisition, according to one embodiment. In one embodiment, a quality talent acquisition module (e.g., the quality talent acquisition module 1000 of FIG. 10) facilitates rapid quality talent acquisition by the TQG in an organization.

Figure 11:
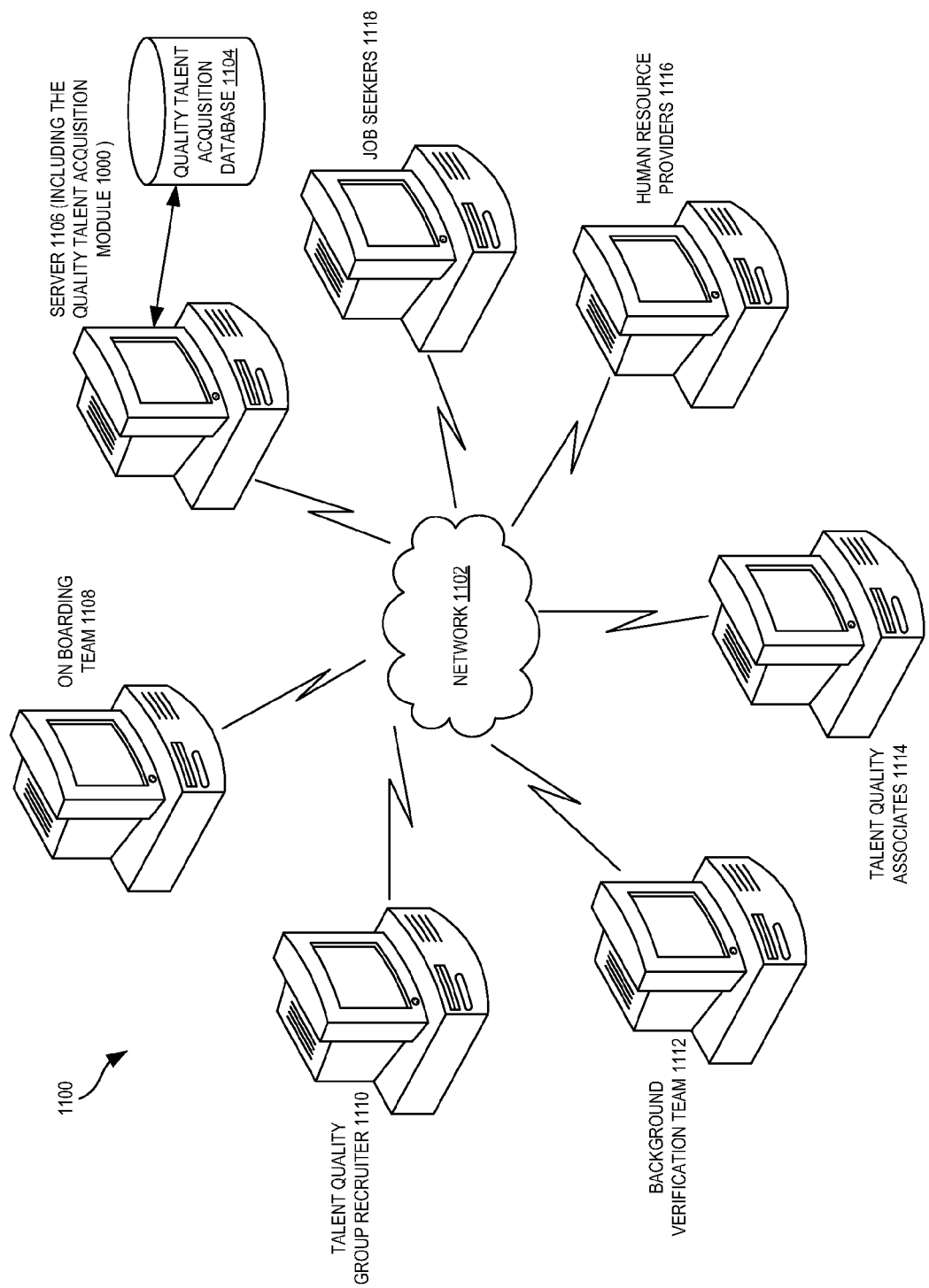
FIG. 11 illustrates a schematic overview of a computing system including the quality talent acquisition module used in identifying fraudulent practices in the high volume job hiring process, according to one embodiment.

At step 102, a plurality of candidate e-dossiers associated with a plurality of candidates are complied and stored in a quality talent acquisition database (e.g., the quality talent acquisition database 1104 of FIG. 11). At step 104, one or more prospective candidates are selected from the plurality of candidate e-dossiers stored in the quality talent acquisition database for pre-selection interviews. The quality talent acquisition database also stores historical data associated with fraudulent practices used during the talent acquisition. The plurality of candidate e-dossiers includes job information associated with a plurality of candidates. The pre-selection interviews may be technical interviews or human resource (HR) interviews.

During the HR interview, documents submitted by one or more prospective candidates may be verified using a document checklist T101. An exemplary detailed document checklist T101 is shown in FIG. 12 and is explained in more detail below with reference to the FIG. 12. The one or more prospective candidates may be selected for job positions such as regular/permanent employee positions, contract employee positions, campus recruited employee positions, lateral employment positions, and the like.

At step 106, information associated with fraudulent practices used in the pre-selection interviews is obtained and the obtained information is stored in the quality talent acquisition database. Further, one or more candidates are selected for a post-selection process based on an outcome of the pre-selection interviews. The candidate e-dossiers associated with the selected one or more candidates are updated using any additional information obtained during the pre-selection interviews.

At step 108, the selected one or more candidates are sampled in real-time based on an outcome of the post-selection process using the candidate e-dossiers, the historical data associated with fraudulent practices and an input and trigger based statistical algorithm, as illustrated in FIGS. 2 through 5. For example, the selected one or more candidates are randomly sampled using the processor based on a first set of parameters. The first set of parameters is obtained from the candidate e-dossiers and the historical data associated with fraudulent practices.

For example, the first set of parameters includes but not limited to geographical/residential location of the prospective candidate, source from where the prospective job information was received, prospective candidate referral information, and interviewer information. Also, the first set of parameters may include information associated with past employers, school from where the candidate graduated, and the like. In one embodiment, sampling rate for sampling the selected one or more candidates for identifying the fraudulent practices is determined based on the first set of parameters.

Further, a second set of parameters is obtained from the candidate e-dossiers and the historical data associated with the fraudulent practices. The job information in the candidate e-dossiers associated with the randomly sampled candidates is dynamically analyzed based on the second set of parameters. For example, the second set of parameters may be default parameters or user modified parameters and include but not limited to process non-compliance, policy non-compliance, geographical/residential location of candidate, documents submitted by the candidate, and a list of companies/schools confirmed and known to be fraudulent. A detailed list of the second set of parameters is given in an e-dossier evaluation checklist T201 shown in FIG. 13 and described in detail with respect to that figure.

In one embodiment, the TQG may tag candidate e-dossiers such that the tagged e-dossiers (other than the sampled candidates) are also dynamically analyzed based on the e-dossier evaluation checklist T201. At step 110, any fraudulent practices used in the sampled and selected one or more candidates are verified using the candidate e-dossiers and the historical data associated with fraudulent practices to facilitate rapid quality talent acquisition. Further, the quality talent acquisition database is updated with any fraudulent information found during the post-selection process.

Also, discrepancies associated with the randomly sampled candidates verified with the fraudulent practices are reconciled. The sampling rate may be also refined based on an outcome of identified fraudulent practices using the processor. Furthermore, the historical data associated with fraudulent practices is updated using the discrepancies associated with the randomly sampled candidates verified with the fraudulent practices. At step 112, job offers are generated and sent to the sampled and selected one or more candidates based on the outcome of the verification.

Figure 2:
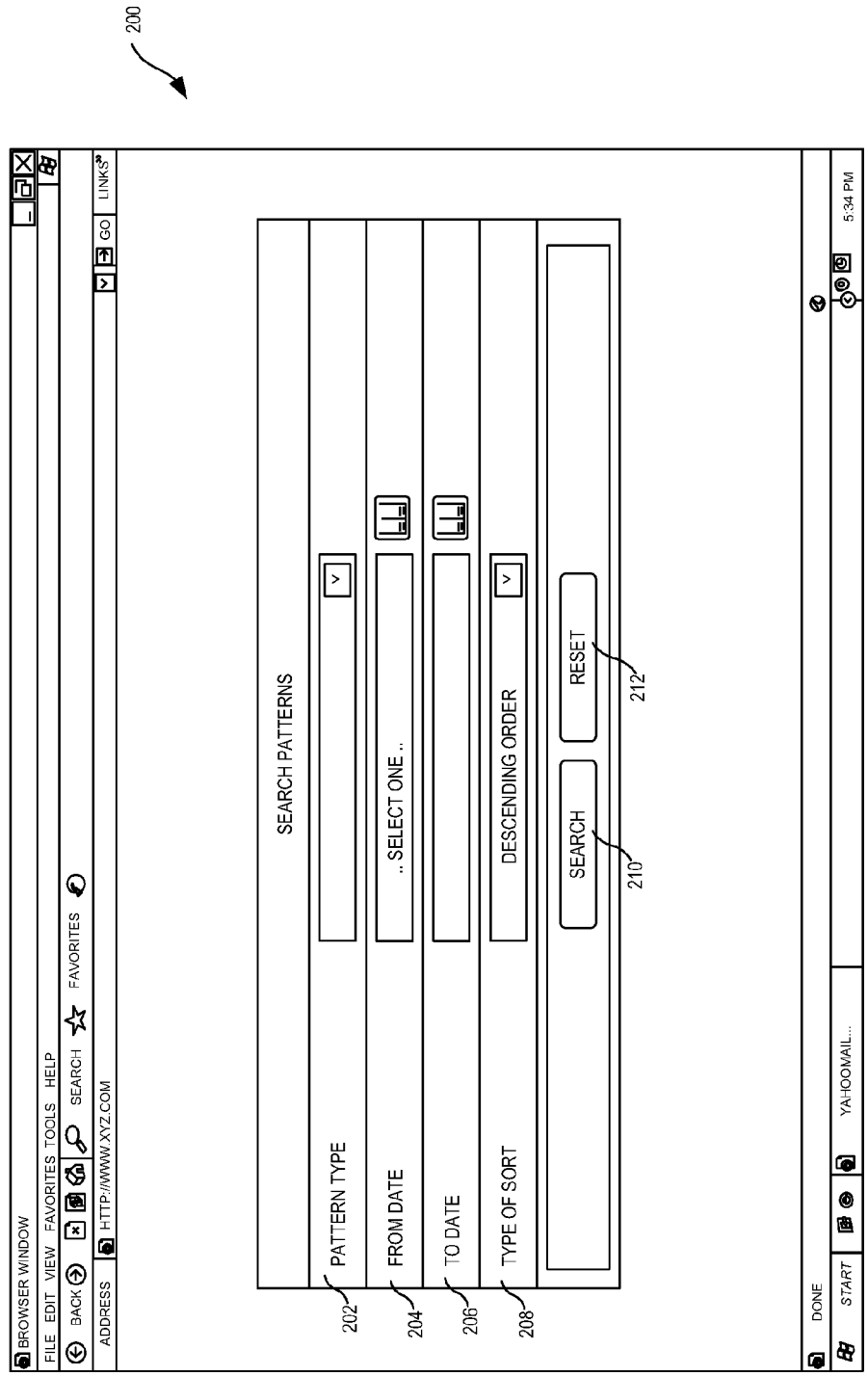

FIGS. 2 through 5 illustrate screenshots showing sampling the one or more candidates using an input and trigger based statistical algorithm for fraudulent practices, according to one embodiment. Particularly, FIG. 2 illustrates a screenshot 200 of pattern search performed using the quality talent acquisition module, according to one embodiment. The screenshot 200 displays a pattern type field 202, a from data field 204, a to date field 206, a type of sort field 208, a search tab 210 and a reset tab 212. For example, the TQG enters a pattern type (e.g., time bound) in the pattern type field 202 to obtain e-dossiers of the one or more candidates for sampling. The TQG also enters a period of sampling in the from date field 204 and the to date field 206.

Further, the TQG may obtain the candidate e-dossiers in any particular order (e.g., ascending order, descending order, etc.) by entering in the type of sort field 208. The candidate e-dossiers are pulled out from the data storage medium based on the entered search patterns using the search tab 210 or the search patterns may be reset using the reset tab 212.

Figure 3:
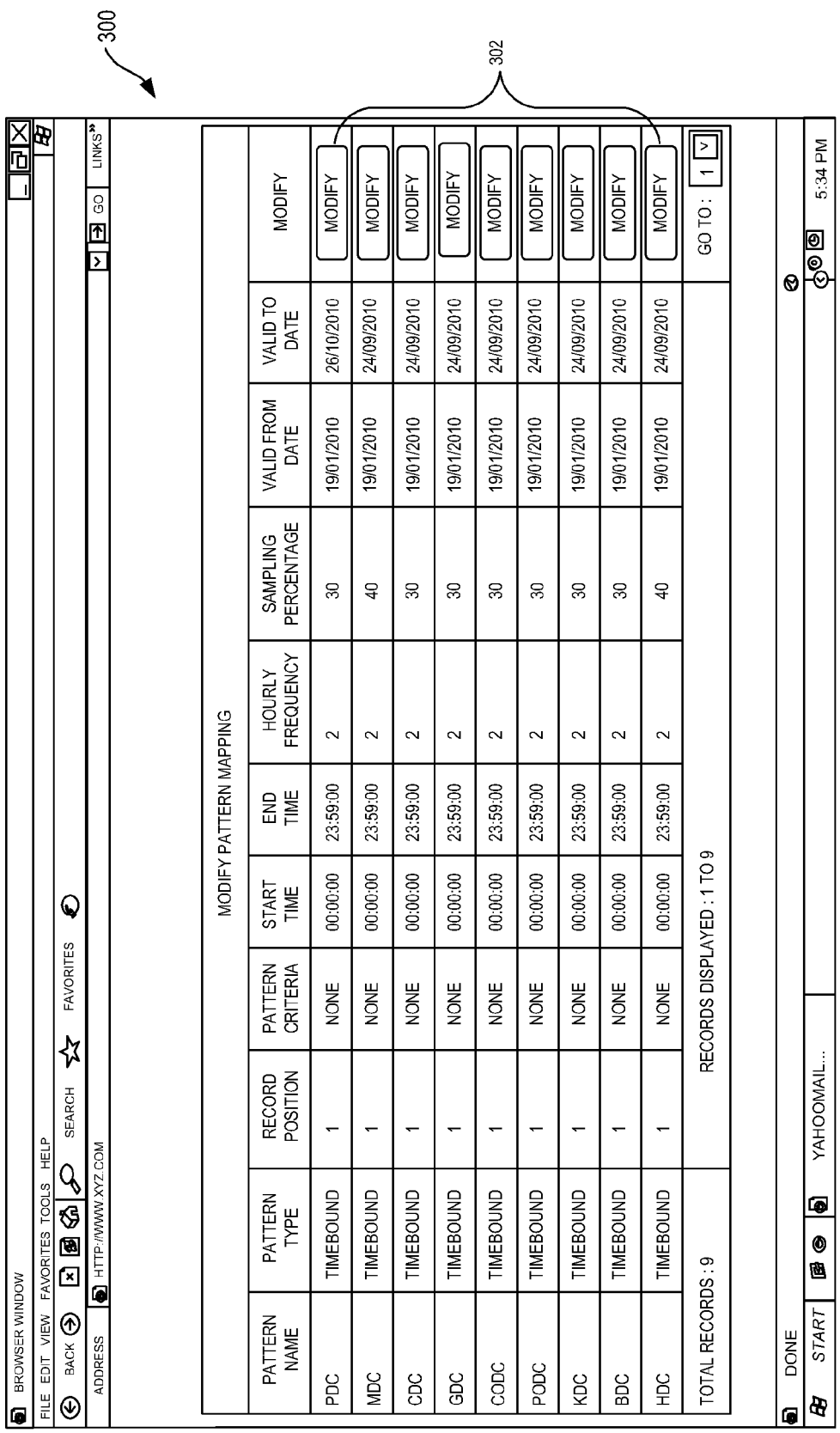

FIG. 3 illustrates a screenshot 300 showing default sampling parameters for sampling candidate e-dossiers, according to one embodiment. Particularly, the screenshot 300 displays the default sampling parameters such as pattern name, pattern type, record position, pattern criteria, start time, end time, hourly frequency, sampling percentage, valid from date and valid to date. The TQG may modify the default sampling parameters using modify tabs 302, as illustrated in FIG. 3.

Figure 4:
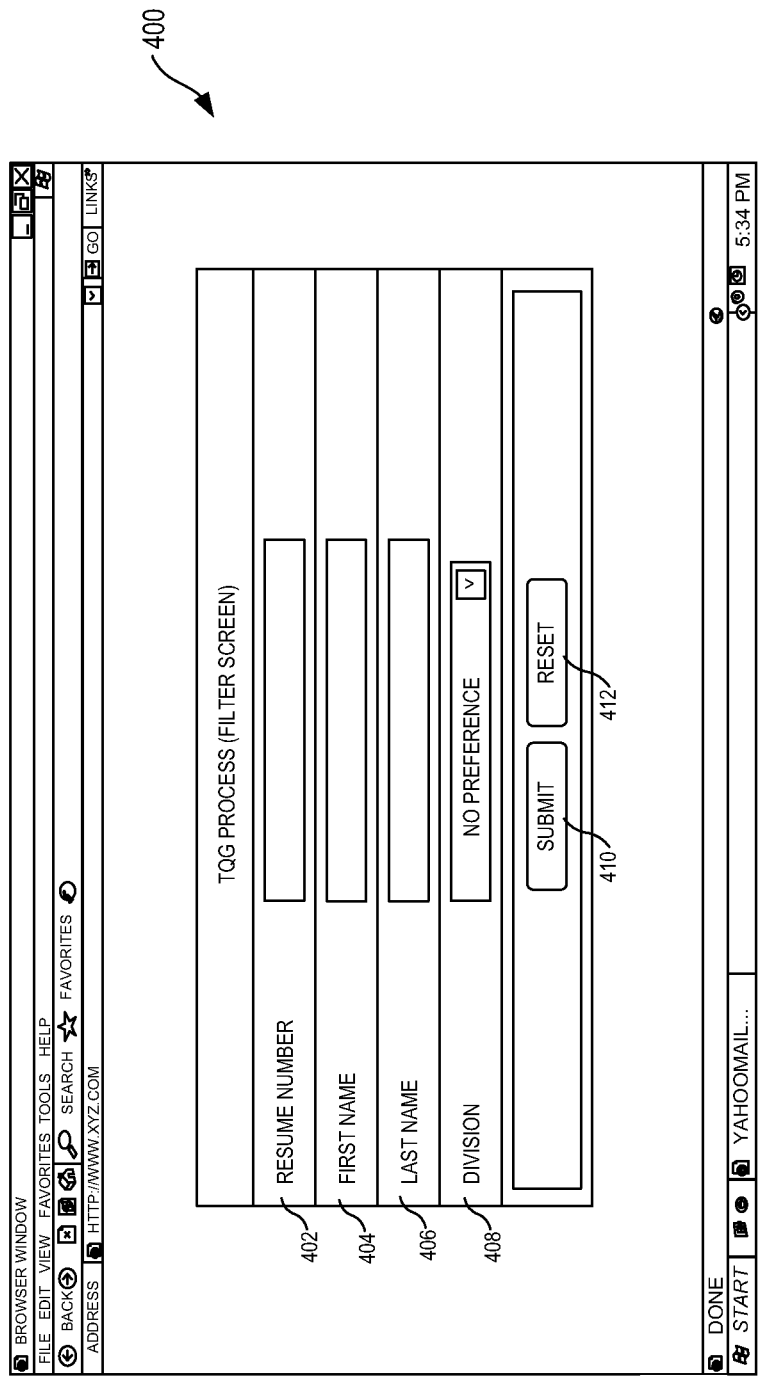

FIG. 4 illustrates a screenshot 400 showing a TQG process filter screen, according to one embodiment. Particularly, the screenshot 400 displays a resume number field 402, a first name field 404, a last name field 406, a division filed 408, a submit tab 410 and a reset tab 412. The TQG process filter screen enables the TQG to filter a particular candidate e-dossier from the data storage medium by entering a resume number, first name, last name and division associated with the candidate e-dossier in the resume number field 402, the first name field 404, the last name field 406, and the division filed 408 respectively. The candidate e-dossier is filtered out using the submit tab 410. The TQG process filter screen may be reset using the reset tab 412.

Figure 5:
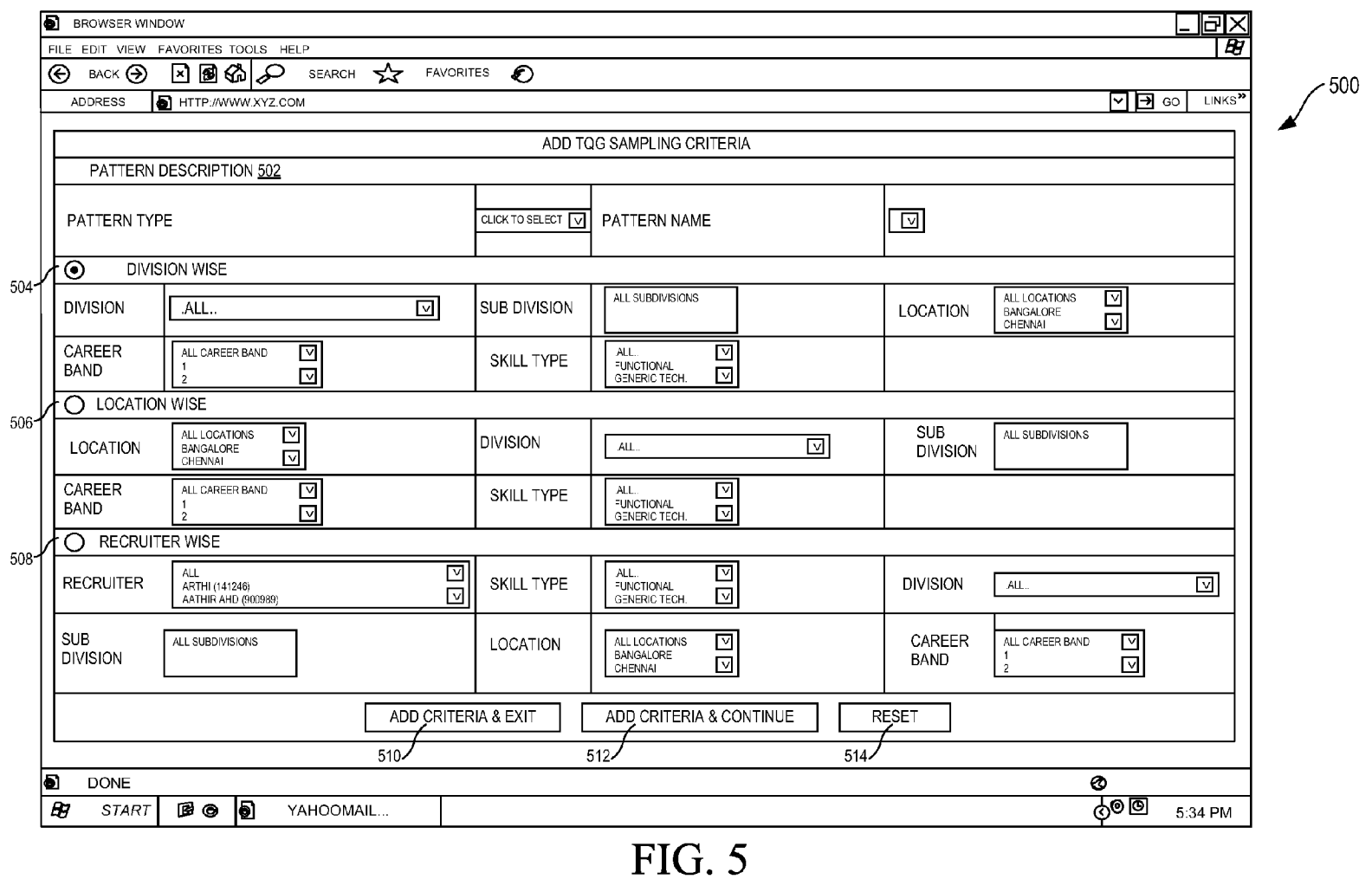

FIG. 5 illustrates a screenshot 500 showing configurable TQG sampling criteria for sampling the candidate e-dossiers based on location, recruiter, interviewer, vendor, employee referral, and the like, according to an embodiment. Particularly, the screenshot 500 enables the TQG to add finer TQG sampling criteria for sampling the candidate e-dossiers. The TQG may enter the sampling criteria based on division, location, recruiter for a particular pattern description (e.g., pattern type and pattern name).

As shown, a pattern description field 502 enables the TQG to enter the pattern type and the pattern name. For the pattern description entered, the TQG enters the finer TQG sampling criteria in a division wise field 504, a location wise field 506 and a recruiter wise field 508. Further, using tabs such as add criteria and exit tab 510, add criteria and continue tab 512 and reset tab 514, the TQG may exit the screen 500, continue to sample the candidate e-dossiers based on the entered TQG sampling criteria and reset the TQG sampling criteria respectively.

FIG. 6 illustrates a screenshot 600 showing process used by the quality talent acquisition module to accept or reject a prospective candidate, according to an embodiment. As shown, the screenshot 600 displays a sampled candidate e-dossier. The candidate e-dossier is obtained using the input and trigger based statistical algorithm explained in FIGS. 2 through 5. The quality talent acquisition module enables the TQG to evaluate the candidate e-dossier for identifying and verifying the fraudulent practices in the sampled candidates using the candidate e-dossier evaluation checklist T201 and approve the candidate e-dossier using a verify/approve checklist tab 602.

FIG. 7 illustrates a screenshot 700 showing details associated with the sampled candidate e-dossier and the interview details, according to one embodiment. In one embodiment, the screenshot 700 may be displayed when the TQG clicks on the verify/approve checklist tab 602. The TQG verifies and approves the sampled candidate e-dossier using the e-dossier evaluation checklist T201 (shown in FIG. 13). The e-dossier evaluation checklist has details of documents which have to be evaluated and also various parameters against which the each document has to be checked.

As illustrated, the screenshot 700 displays details including candidate information such as resume number and candidate name, requirement information such as job code and division/sub-division, TQG evaluation information such as TQA name, TQA/line recruiter name, interview type such as first technical interview and HR interview, band of panel and email ID of panel. The TQG analyses the displayed details of the sampled candidate e-dossier and identifies discrepancies in documents submitted by the prospective candidate.

After completing the analyses, if the TQG finds any gaps in the candidate e-dossier with respect to process, policy or documentation, the TQG marks the respective gaps as per severity (e.g., severity 1, 2, 3, and 4, where severity 1 is the lowest and severity 4 is the highest) defined by a TQG evaluation process. If a severity is identified, the candidate e-dossier is marked for seeking clarification from the TQG and also from the candidate using a seek clarification tab 702. In one embodiment, reconciliation may ensure that the discrepancies are reconciled and the corresponding severity becomes "0" which is equivalent to no severity. For reconciling all the discrepancies, the TQG may return the candidate e-dossier to a respective member of the TQG and get all the gaps reconciled and severities brought down to 0. If the TQG identifies that candidature is not up to mark or the process policy violation has occurred, the severity may be upgraded to severity 4.

If there is no discrepancy found, the TQG may approve the candidate e-dossier using an approve tab 704. The TQG may also reject the candidate e-dossier using a reject tab 706. A reset tab 708 enables the TQG to reset the evaluation information and overall clarification comments. Further, the TQG may choose a hard closure (T205) on a candidate e-dossier with discrepancies using a hard closure tab 710.

Figure 8:
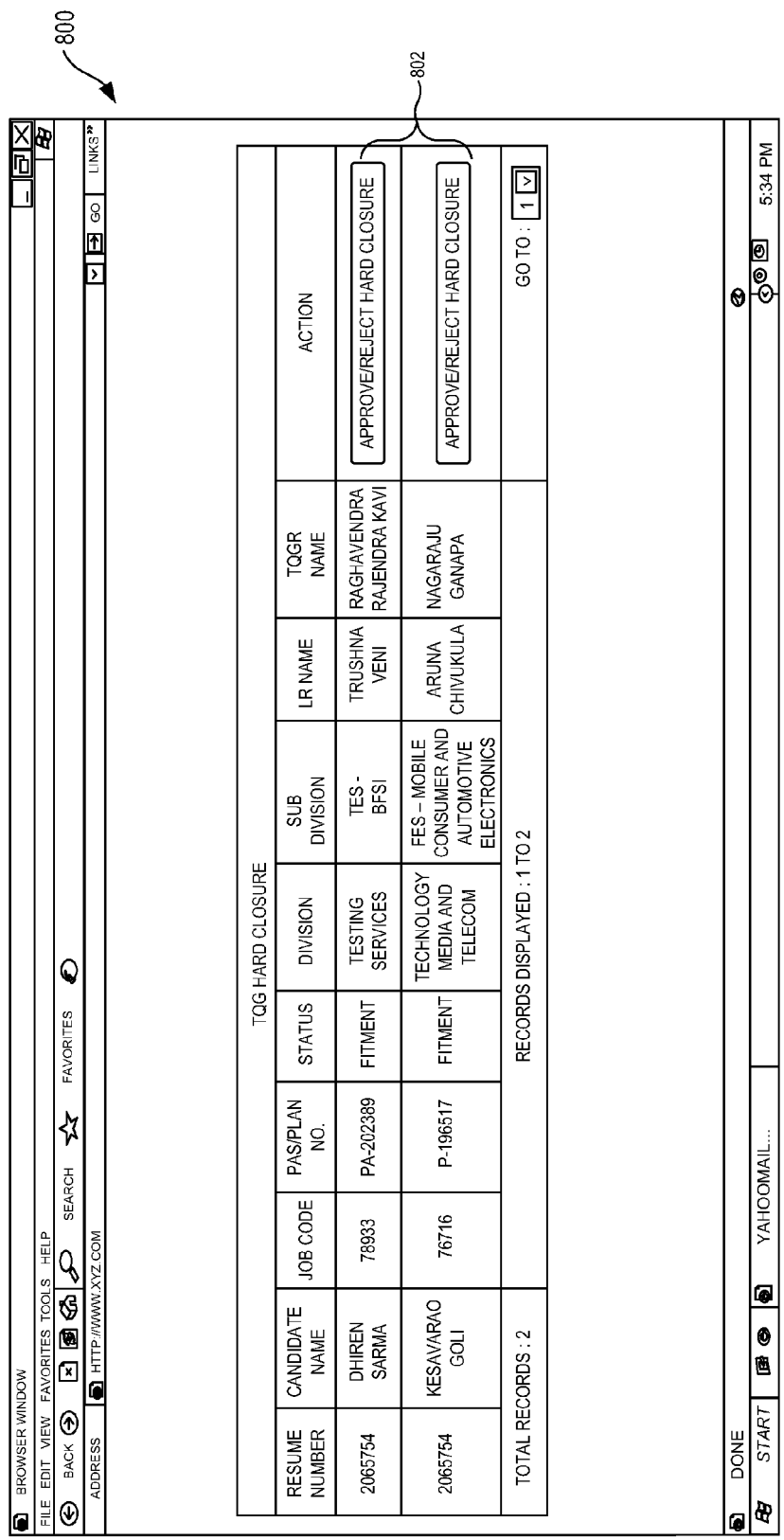
FIG. 8 illustrates a screenshot showing a process in which a talent quality group (TQG) accepts or rejects a candidate e-dossier with discrepancies, according to an embodiment.

FIG. 8 illustrates a screenshot 800 showing a process in which the TQG accepts or rejects the candidate e-dossier with discrepancies, according to an embodiment. In one embodiment, the screenshot 800 may be displayed when the TQG clicks on the hard closure tab 710. As shown in FIG. 8, the screenshot 800 displays a list of candidates selected for a hard closure. The prospective candidates who are not recommended for hiring due to missing data and/or relevant documents may still be approved for the hard closure using the approve/reject hard closure tab 802. The missing data and/or relevant documents may be submitted by the prospective candidates at a later stage.

FIG. 9 illustrates a screenshot 900 showing academic and employment gaps of a prospective candidate that are identified by the quality talent acquisition module, accordingly to one embodiment. As illustrated, the screenshot 900 displays academic and employment gaps of a particular candidate chosen for hard closure (T205). In one embodiment, the academic and employment gaps may be identified using the checklist and process explained in the forgoing description. The academic and employment gaps are analyzed and the candidate may be approved for hiring using an approve tab 902 or rejected using a reject tab 904. Further, the candidate may be approved by a talent acquisition head and a talent quality operations head using a talent acquisition head approval tab 906 and a talent quality operations head approval tab 908 respectively.

Figure 10:
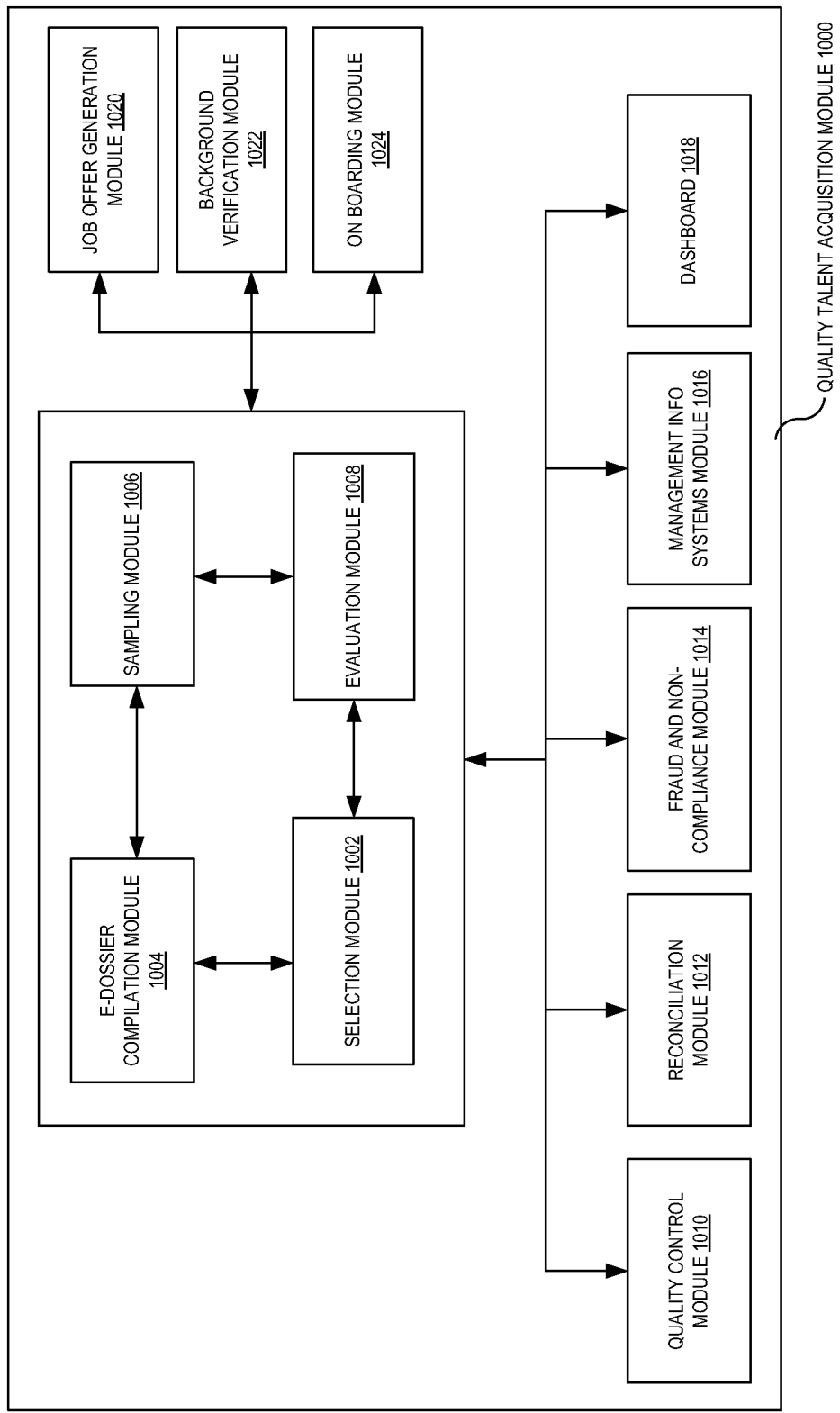
FIG. 10 illustrates an exploded view of the quality talent acquisition module, accordingly to one embodiment.

FIG. 10 illustrates an exploded view of a quality talent acquisition module 1000, accordingly to one embodiment. As illustrated, the quality talent acquisition module 1000 includes a selection module 1002, an e-dossier compilation module 1004, a sampling module 1006, an evaluation module 1008, quality control module 1010, a reconciliation module 1012, a fraud and non-compliance module 1014, a management info systems (MIS) module 1016, a dashboard 1018, a job offer generation module 1020, a background verification module 1022, and an on boarding module 1024.

The selection module 1002 selects the one or more prospective candidates from the plurality of candidate e-dossiers stored in the quality talent acquisition database for pre-selection interviews. The selection module 1002 also selects one or more candidates for a post-selection process based on an outcome of the pre-selection interviews. The e-dossier compilation module 1004 compiles e-dossiers associated with the plurality of candidates, stores the candidate e-dossiers in the quality talent acquisition database, and updates the candidate e-dossiers associated with the selected one or more candidates using any additional information obtained during the pre-selection interviews.

The fraud and non-compliance module 1014 coupled to the selection module 1002 obtains information associated with fraudulent practices used in the pre-selection interviews and stores the obtained information associated with the fraudulent practices in the quality talent acquisition database (e.g., the quality talent acquisition database 1104 of FIG. 11). The sampling module 1006 samples on a real-time basis the selected one or more candidates based on an outcome of the post-selection process using the candidate e-dossiers, the historical data associated with fraudulent practices, and the input and trigger based statistical algorithm.

Further, the fraud and non-compliance module 1014 verifies any fraudulent practices used in the sampled and selected one or more candidates using the candidate e-dossiers, the historical data associated with fraudulent practices to facilitate rapid talent acquisition and to update the quality talent acquisition database with any fraudulent information found during the post-selection process.

The job offer generation module 1020 generates and sends out offers to the sampled and selected one or more candidates based on the outcome of the verification by the fraud and non-compliance module 1014. The evaluation module 1008 dynamically analyzes the candidate e-dossiers for identifying and verifying the fraudulent practices in the sampled candidates based on the checklist (e.g., the e-dossier evaluation checklist T201).

The quality control module 1010 ensures quality in the high volume job hiring process. The reconciliation module 1012 reconciles discrepancies associated with the randomly sampled candidates verified with the fraudulent practices. Further, the fraud and non-compliance module 1014 updates the historical data associated with fraudulent practices using the reconciled discrepancies associated with the randomly sampled candidates verified with any fraudulent practices. The MIS module 1016 furnishes information associated with the fraudulent practices such that processes involved in the quality control by the TQG may be refined.

The dashboard 1018 displays a status of the processes and relevant information associated with the processes from the quality talent acquisition database. The background verification module 1022 enables background verification of potential candidates during the high volume quality talent acquisition. For example, the background verification may be performed before an offer is generated to the potential candidates or after the offer is generated. The on boarding module 1024 facilitates the candidates who received the offer to join for work at the organization.

FIG. 11 illustrates a schematic overview of a computing system 1100 including the quality talent acquisition module 1000 used in identifying the fraudulent practices in the high volume job hiring process, according to one embodiment. As shown, the computing system 1100 includes a server 1106 with the quality talent acquisition module 1000. The server 1106 is coupled to a quality talent acquisition database 1104 which includes the plurality of candidate e-dossiers and the historical data associated with fraudulent practices used in the talent acquisition. The server 1106 is accessed by a plurality of users through a network 1102.

The plurality of users include an on boarding team 1108, a TQG recruiter 1110, a background verification team 1112, TQA 1114, human resource providers 1116, job seekers 1118 and the like, as illustrated in FIG. 11. Using the quality talent acquisition module 1000, e-dossier information, and job information are stored in the quality talent acquisition database 1104 on a real-time basis by the plurality of users. Thus, prospective candidates are acquired by the TQG quickly without any undue delay in the high volume hiring process.

In one example scenario, job seekers 1118 and human resource providers 1116 send job information associated with one or more candidates. The TQG recruiter 1110 then selects one or more prospective candidates from the plurality of candidate e-dossiers stored in the quality talent acquisition database 1104 for pre-selection interviews. The TQG recruiter 1110 further selects one or more candidates for a post-selection process based on the outcome of the pre-selection interviews.

The quality talent acquisition module 1000 then samples the selected one or more candidates in real-time based on the outcome of the post-selection process using the candidate e-dossiers and the input and trigger based statistical algorithm. The background verification team 1112, the TQA 1114, and the TQG recruiter 1110 then identifies any fraudulent practices in the pre-selection interviews and the post selection process using the candidate e-dossiers and the input and trigger based statistical algorithm. The offer letters may be generated and sent to the sampled candidates based on the outcome of the identified fraudulent practices. Further, the on boarding team 1108 facilitates the joining of the candidates who received the offer.

FIG. 12 illustrates the document checklist T101, according to one embodiment. The document checklist T101 is a self inked document, which is used by a TQA and a line recruiter (LR) to check for necessary documents of a technically selected candidate before a pre-selection interview (e.g., a face to face HR interview). The document checklist T101 may work as a reference for the TQA and the LR to ensure that all the necessary documents are brought by the prospective candidates selected for the pre-selection interviews and also to check for quality of the documents by checking with original certificates.

As shown, the document checklist T101 is divided into a section A and a section B. The section A is filled by the TQA after checking original certificates and collecting photocopies of mandatory documents from the prospective candidates. Section B is filled up by the LR before the face to face HR interview. The document checklist T101 is a self carbon document. The TQA hands over the original document checklist T101 to the LR after filling the section A before escorting the prospective candidates for the HR Interview while the duplicate is retained by the TQA.

The section B of the original copy of the document checklist T101 is filled up by the LR before the HR interview. The TQA fills section B of the duplicate copy at the end of the day, and reports variance if any to a TQG executive (using a variance/observation template). However, if the LR sends the HR interview schedule twenty four hours in advance to the TQA, the TQA will fill the section B of the carbon sheet before the HR interview.

As illustrated, section A includes details such as company application form (CAM), income tax documents, permanent account number (PAN), previous and present employment details, educational mark sheets, date of face to face technical interview, etc. Section B includes details such as ex-employee, do not hire (DNH) company, DNH University, technical assessment for (TAF), curriculum vitae (CV), relevant technical certifications, e-assessment result and date, etc. The TQA and the LR may also provide comments in a TQA/LR comments column 1202.

FIG. 13 illustrates the e-dossier evaluation checklist T201, according to one embodiment. The e-dossier evaluation checklist T201 is an exhaustive online checklist which is used by the TQG recruiter to make all the necessary checks on the sampled e-dossiers which are created post fitment approval by a respective divisional resource manager (DRM). The e-dossier evaluation checklist T201 may enable the TQG recruiter to check for documentation, patterns, selection process followed and may work as a reference for the TQG recruiter to make recommendation for the candidature. The overall comments may be provided in an overall clarification comments column 1302. The comments may be submitted using a submit tab 1304, reset using a reset tab 1306 and saved using the save tab 1308.

The e-dossier evaluation checklist T201 provides guidelines to the TQG recruiter based on which the evaluation of the sampled candidate e-dossiers may be carried out for process, policy, and document compliance. The e-dossier evaluation checklist T201 includes details of documents which have to be evaluated and also the various parameters against which the each document has to be checked.

The e-dossier evaluation checklist T201 also provides the severity view in a default severity column 1310 and a final severity column 1312. The e-dossier evaluation checklist T201 documents step by step the procedure to conduct the evaluation of the candidate e-dossier. The first sheet of the e-dossier evaluation checklist T201 is a history sheet which enables the TQG recruiters to record the progress of evaluation of each criterion that needs to be checked. This gives guidelines to the TQG recruiter based on which the evaluation of the sampled candidate e-dossiers may be carried out.

As shown, the e-dossier evaluation checklist T201 includes e-dossier completeness, people allocation system (PAS) No./Job code (JC)/Job description (JD), curriculum vitae (CV), e-assessment, technical assessment form (TAF), company application form (CAM), income tax documents (Form 16/Saral Form/Form W-2), permanent account number (PAN) card, payroll/salary proof/hike letter/appointment letter, ID card, offer, relieving and experience letter of previous organization, passport(s), mark sheet, human resource (hr) assessment forms (HAFs), fitment, policy and process, faceplate-pre HR checklist, etc.

Figure 14:
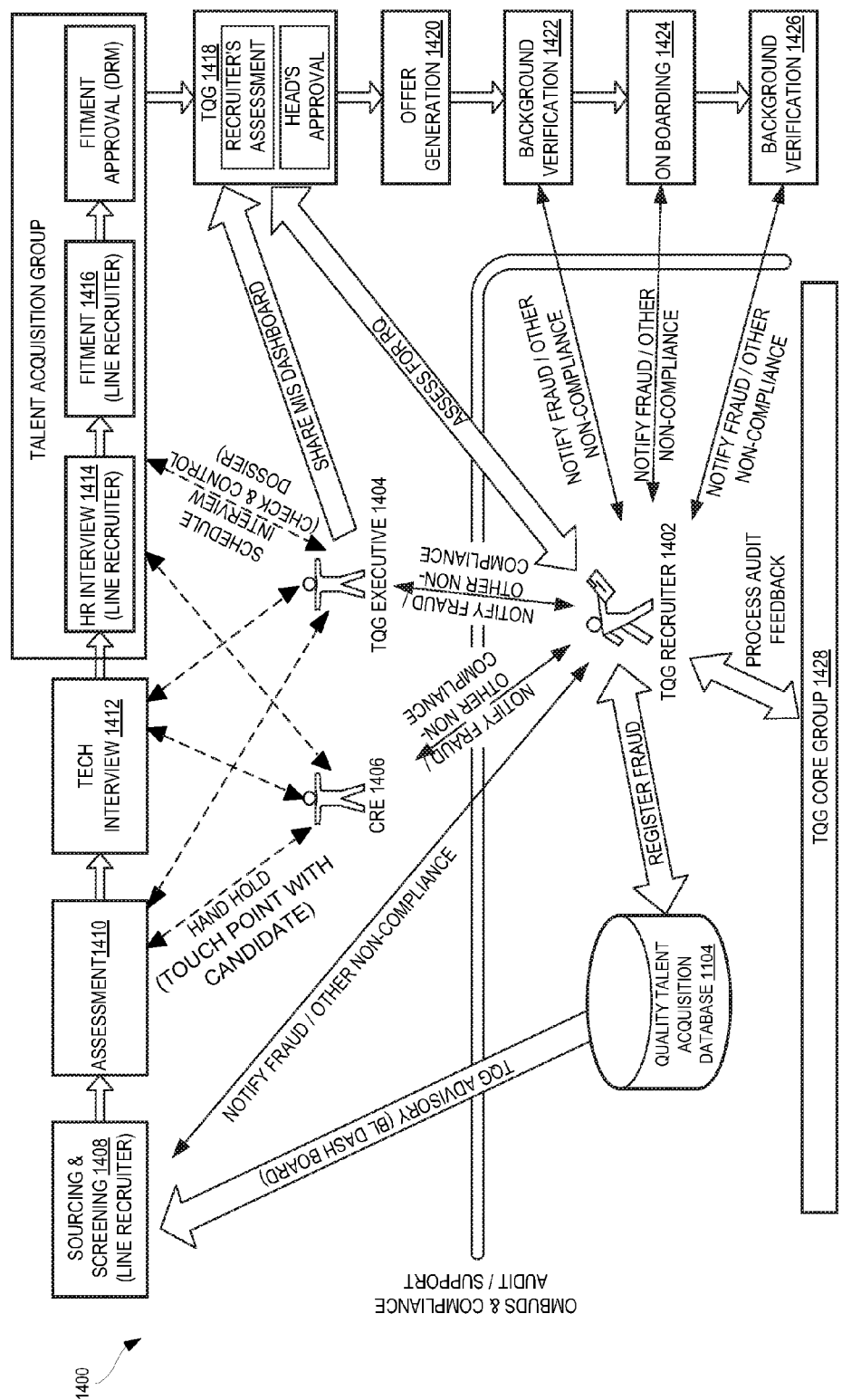
FIG. 14 illustrates a block diagram showing processes involved in quality talent acquisition by the TQG in an organization, according to one embodiment.

FIG. 14 illustrates a block diagram 1400 showing the processes involved in the quality talent acquisition by the TQG in an organization, according to one embodiment. As shown, a TQG recruiter 1402 ensures that quality candidates are hired in the organization. The TQG recruiter 1402 obtains alerts for fraudulent practices and non-compliance and accordingly proceeds or stops the quality talent acquisition. The fraudulent practices may be external or internal. The external fraudulent practices may be fraud due to source, and due to demography information of the candidate (location, employer, academia, etc.). The internal fraud may include fraudulent practices by the interviewer, HR and process non-compliance, etc.

The TQG recruiter 1402 works closely with a TQG executive 1404 and a candidate relationship executive (CRE) 1406 for executing the processes. For example, the TQG executive 1404 controls and updates the candidate e-dossiers. Also, the TQG executive 1404 communicates with the candidates for scheduling interviews and the like. The TQG ensures process, policy and document compliance at each stage of the talent acquisition by notifying the identified fraudulent practices to the TQG recruiter 1402. During a sourcing and screening stage 1408, a LR performs an initial screening such that potential candidates for a particular job may be selected. Any fraudulent practice or non-compliance detected may be reported to the TQG recruiter 1402.

Then, candidate e-dossiers associated with the selected candidates may be assessed during an assessment stage 1410. The candidate e-dossiers may be assessed for integrity of candidate information and other relevant information. Then, during a technical interview stage 1412, the candidates are interviewed for their technical skill. The technical interview may be a face to face interview. An interview log may be updated accordingly. Further, the candidates selected in the technical interview may go into an HR interview stage 1414. During the HR interview, the candidates may be interviewed in person and relevant documents may be verified by the LR.

Once the candidates have cleared the HR interview, fitment of the candidates is performed in a fitment stage 1416 by the LR. For example, the LR checks whether the candidates are eligible and appropriate for the particular job position for which the interview was performed. Also, fitment of salary is considered such that the offered salary is neither too low nor high. Once the fitment is approved by a divisional recruitment manager (DRM), the candidate e-dossiers are assessed by the TQG recruiter 1402 as shown in a TQG stage 1418. The processes performed before the TQG stage 1418 are referred to as pre-selection processes and processes occurring after the TQG stage 1418 are referred to as post-selection processes.

The TQG recruiter 1402 samples the candidate e-dossiers based on location, recruiters, divisions, etc. Then, at an offer generation stage 1420, offers are generated to the sampled and selected one or more candidates. Further, background verification of the candidates is performed at background verification stage 1422 where details such as prior employers, prior earnings, prior taxable income, and the like are verified. Based on the background verification, a background verification log is updated. The verified candidates are asked to on board the organization at an on boarding stage 1424. It can be seen that, a second background verification is also performed at a background verification stage 1426, after the candidates have joined the organization to confirm compliance of various processes and policies of the organization.

At each stage of the job hiring by the TQG, fraudulent practices are identified and non-compliance with any process, policy, and documents are reported to the TQG recruiter 1402. The TGQ executive 1404 and the CRE 1406 are touch points with the candidates and identifies the fraudulent practices and other non-compliances. Further, the identified fraudulent practices and other non-compliances are reported to the TQG recruiter 1402. In one embodiment, the TQG recruiter 1402 registers the fraudulent practices and process defects identified during the job hiring in the quality talent acquisition database 1104. Also, other information relevant to the job hiring processes such as interviewer details, candidate information, etc. are stored in the quality talent acquisition database 1104.

Further, the TQG recruiter 1402 sends a summary of the job hiring process to a TQG core group 1428. The TQG core group 1428 audits the process for fraudulent practices and non-compliances and creates a time stamp summary which may be outputted through a dashboard. Thus, information about internal and external fraudulent practices identified during the job hiring process is visible to the TQG which may enable to redefine the processes from time to time for improved quality talent acquisition.

Figure 15:
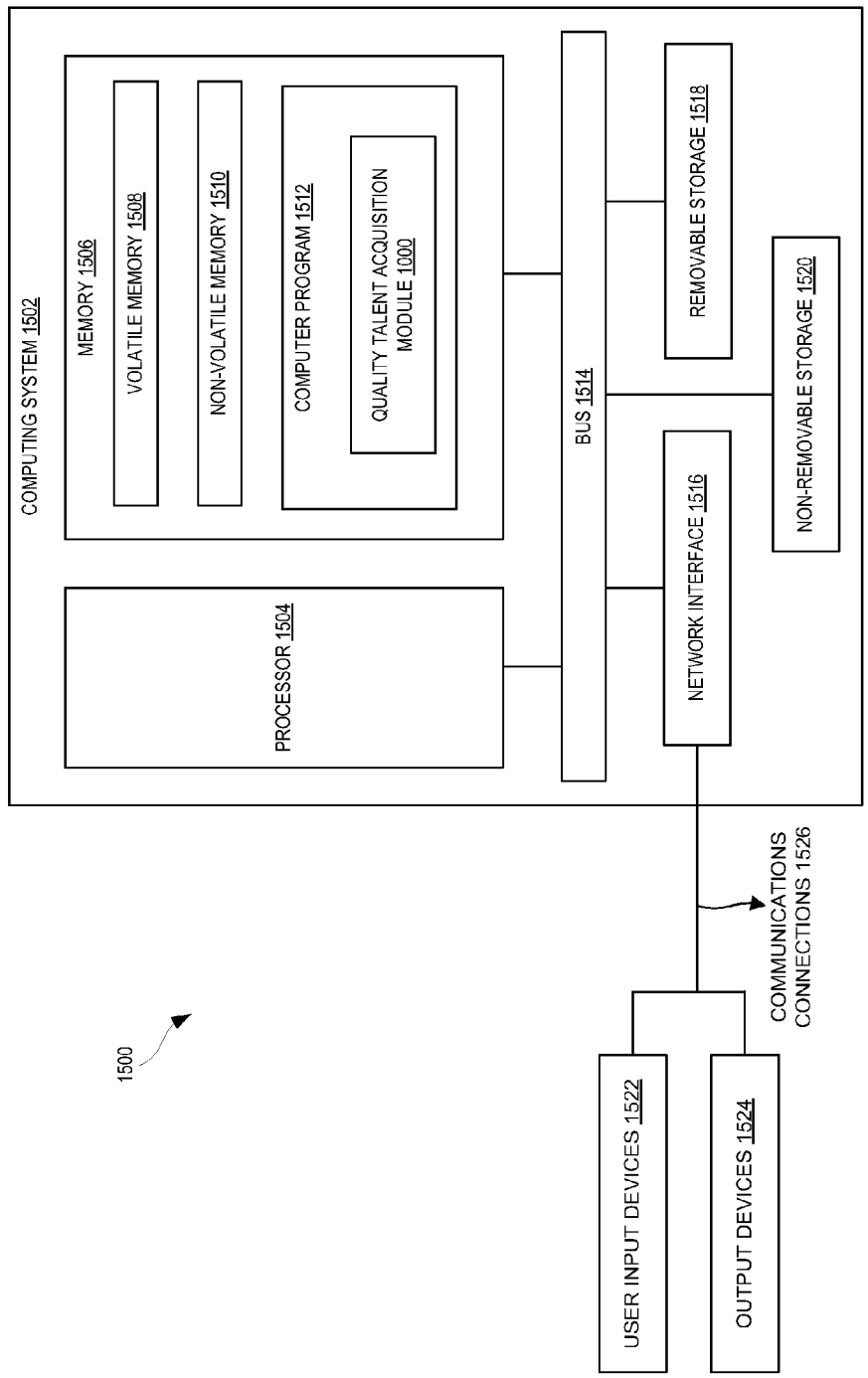
FIG. 15 illustrates an example of a suitable computing system environment for implementing embodiments of the present subject matter.

FIG. 15 shows an example of a suitable computing system environment 1500 for implementing embodiments of the present subject matter. FIG. 15 and the following discussion are intended to provide a brief, general description of a suitable computing environment in which certain embodiments of the inventive concepts contained herein may be implemented.

A general computing system 1502, in the form of a personal computer or a mobile device may include a processor 1504, memory 1506, a removable storage 1518, and a non-removable storage 1520. The computing system 1502 additionally includes a bus 1514 and a network interface 1516. The computing system 1502 may include or have access to the computing system environment 1500 that includes one or more user input devices 1522, one or more output devices 1524, and one or more communication connections 1526 such as a network interface card or a universal serial bus connection.

The one or more user input devices 1522 may be a digitizer screen and a stylus, trackball, keyboard, keypad, mouse, and the like. The one or more output devices 1524 may be a display device of the personal computer or the mobile device. The communication connections 1526 may include a local area network, a wide area network, and/or other networks.

The memory 1506 may include volatile memory 1508 and non-volatile memory 1510. A variety of computer-readable storage media may be stored in and accessed from the memory elements of the computing device 1502, such as the volatile memory 1508 and the non-volatile memory 1510, the removable storage 1518 and the non-removable storage 1520. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 1504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1504 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 1504 of the computing system 1502. For example, a computer program 1512 may include machine-readable instructions capable of quality control in a high volume talent acquisition, according to the teachings and herein described embodiments of the present subject matter. In one embodiment, the computer program 1512 may be included on a compact disk-read only memory (CD-ROM) and loaded from the CD-ROM to a hard drive in the non-volatile memory 1510. The machine-readable instructions may cause the computing system 1502 to encode according to the various embodiments of the present subject matter.

As shown, the computer program 1512 includes the quality talent acquisition module 1000. For example, the quality talent acquisition module 1000 may be in the form of instructions stored on a non-transitory computer-readable storage medium. The non-transitory computer-readable storage medium having the instructions that, when executed by the computing system 1502, may cause the computing system 1502 to perform the one or more methods described in FIGS. 1 through 15.

In various embodiments, the systems and methods described in FIGS. 1 through 15 may identify fraudulent practices and process non-compliance during a high volume job hiring process using the quality talent acquisition module to improve quality of hire. The above-described methods and systems ensure that right candidates are hired at the right place and at the right time. There is no rework required in the job hiring process due to fraudulent practices, thereby also proving to be a cost effective method. The e-dossiers of the prospective candidates are sampled based on location, recruiters, divisions, etc. The above-described systems and methods enable configuration of the sampling frequency based on statistical data of potential fraudulent practices from location, interviewer, vendor, employee referral, etc.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for quality control in a high volume talent acquisition, the method comprising:
selecting by a talent management computing device one or more prospective candidates from a plurality of candidate e-dossiers stored in a quality talent acquisition database for pre-selection interviews wherein the plurality of candidate e-dossiers comprises job information associated with a plurality of candidates;
obtaining by the talent management computing device information associated with fraudulent practices used in the pre-selection interviews and storing the obtained information associated with fraudulent practices in the quality talent acquisition database;
selecting by the talent management computing device one or more candidates for a post-selection process based on an outcome of the pre-selection interviews, wherein the post-selection process is a process occurring upon completion of the pre-selection interviews;
compiling by the talent management computing device the candidate e-dossiers associated with the selected one or more candidates and storing the candidate e-dossiers associated with the selected one or more candidates in the quality talent acquisition database;
updating by the talent management computing device the candidate e-dossiers associated with the selected one or more candidates using any additional information obtained during the pre-selection interviews;
sampling by the talent management computing device using a sampling rate, on a real-time basis the selected one or more candidates based on an outcome of the post-selection process using the updated candidate e-dossiers associated with the selected one or more candidates, historical data associated with fraudulent practices used in the talent acquisition, and an input and trigger based statistical algorithm, wherein the sampling rate is determined based on the updated candidate e-dossiers associated with the selected one or more candidates, historical data associated with fraudulent practices used in the talent acquisition, and an input and trigger based statistical algorithm;
verifying by the talent management computing device, any fraudulent practices used in the pre-selection interviews and the post selection process using the updated candidate e-dossiers associated with the sampled and selected one or more candidates, the obtained information associated with fraudulent practices used in the pre-selection interviews, and the historical data associated with fraudulent practices used in the talent acquisition to facilitate rapid talent acquisition; and
updating by the talent management computing device the quality talent acquisition database with any fraudulent information found during the verification of any fraudulent practices used in the pre-selection interviews and the post-selection process.

2. The method of claim 1, further comprising generating and sending out by the talent management computing device offers to the sampled and selected one or more candidates based on the outcome of the verification.

3. The method of claim 1, further comprising:
reconciling by the talent management computing device discrepancies associated with the randomly sampled candidates verified with any fraudulent practices; and
updating by the talent management computing device the historical data associated with fraudulent practices using the reconciled discrepancies associated with the randomly sampled candidates verified with any fraudulent practices.

4. The method of claim 1 wherein the sampling further comprises:
obtaining by the talent management computing device a first set of parameters from the updated candidate e-dossiers associated with the selected one or more candidates and the historical data associated with fraudulent practices; and
randomly sampling by the talent management computing device the selected one or more candidates based on the first set of parameters, the historical data associated with fraudulent practices, and the input and trigger based statistical algorithm.

5. The method of claim 4 wherein the first set of parameters comprises one or more of a geographical or residential location of the prospective candidate, source from where the prospective job information was received, or prospective candidate referral information, and interviewer information.

6. The method of claim 1 wherein the obtaining further comprising:
obtaining by the talent management computing device a second set of parameters from the updated candidate e-dossiers associated with the selected one or more candidates and the historical data associated with the fraudulent practices; and
dynamically analyzing by the talent management computing device the job information in the updated candidate e-dossiers associated with the randomly sampled candidates based on the obtained second set of parameters.

7. The method of claim 6 wherein the second set of parameters comprises one or more of a process non-compliance, policy non-compliance, geographical or residential location of candidate, documents submitted by the candidate, or a list of companies or schools confirmed and known to be fraudulent.

8. The method of claim 7 wherein the second set of parameters comprises at least one of default parameters and user modified parameters.

9. The method of claim 1 further comprising determining by the talent management computing device a sampling rate for real-time sampling the selected one or more candidates for verifying any fraudulent practices based on the first set of parameters.

10. The method of claim 9 further comprising refining by the talent management computing device the sampling rate based on an outcome of the verified fraudulent practices.

11. The method of claim 1 wherein the pre-selection interviews comprises technical interviews and human resource (HR) interviews.

12. The method of claim 1 wherein the one or more prospective candidates comprises one or more of a regular or permanent employee positions, contract employee positions, campus recruited employee positions or lateral employment positions.

13. The method of claim 1 further comprising displaying by the talent management computing device a dashboard including the historical data associated with fraudulent practices based on a user request.

14. A non-transitory computer-readable storage medium for quality control in a high volume talent acquisition having instructions that, when executed by a computing device, cause the computing device to perform a method comprising:
selecting one or more prospective candidates from a plurality of candidate e-dossiers stored in a quality talent acquisition database for pre-selection interviews, and wherein the plurality of candidate e-dossiers include job information associated with a plurality of candidates;

obtaining information associated with fraudulent practices used in the pre-selection interviews and storing the obtained information associated with fraudulent practices in the quality talent acquisition database;

selecting one or more candidates for a post-selection process based on an outcome of the pre-selection interviews wherein the post-selection process is a process occurring upon completion of the pre-selection interviews;

compiling the candidate e-dossiers associated with the selected one or more candidates, storing the candidate e-dossiers associated with the selected one or more candidates in the quality talent acquisition database;

updating the candidate e-dossiers associated with the selected one or more candidates using any additional information obtained during the pre-selection interviews;

sampling on a real-time basis using a sampling rate the selected one or more candidates using the updated candidate e-dossiers associated with the selected one or more candidates, historical data associated with fraudulent practices used in the talent acquisition, and an input and trigger based statistical algorithm, wherein the sampling rate is determined based on the updated candidate e-dossiers associated with the selected one more candidates, historical data associated with fraudulent practices used in the talent acquisition, and an input and trigger based statistical algorithm;

verifying any fraudulent practices used in the pre-selection interviews and the post selection process using the updated candidate e-dossiers associated with the sampled and selected one or more candidates, the obtained information associated with fraudulent practices used in the pre-selection interviews, the historical data associated with fraudulent practices used in the talent acquisition to facilitate rapid talent acquisition; and updating the quality talent acquisition database with any fraudulent information found during the verification of any fraudulent practices used in the pre-selection interviews and the post selection process.

15. The medium of claim 14, further comprising generating and sending out offers to the sampled and selected one or more candidates based on the outcome of the verification.

16. The medium of claim 14, further comprising:
randomly sampling the selected one or more candidates;
reconciling discrepancies associated with the randomly sampled candidates verified with any fraudulent practices; and
updating the historical data associated with fraudulent practices using the reconciled discrepancies associated with the randomly sampled candidates verified with any fraudulent practices.

17. The medium of claim 14, wherein the pre-selection interviews comprise technical interviews and human resource (HR) interviews.

18. The medium of claim 14 wherein the sampling further comprises:
obtaining by the talent management computing device a first set of parameters from the updated candidate e-dossiers associated with the selected one or more candidates and the historical data associated with fraudulent practices; and
randomly sampling by the talent management computing device the selected one or more candidates based on the first set of parameters, the historical data associated with fraudulent practices, and the input and trigger based statistical algorithm.

19. The medium of claim 18 wherein the first set of parameters comprises one or more of a geographical or residential location of the prospective candidate, source from where the prospective job information was received, prospective candidate referral information, or interviewer information.

20. The medium of claim 14 wherein the obtaining further comprising:
obtaining by the talent management computing device a second set of parameters from the updated candidate e-dossiers associated with the selected one or more candidates and the historical data associated with the fraudulent practices; and
dynamically analyzing by the talent management computing device the job information in the updated candidate e-dossiers associated with the randomly sampled candidates based on the obtained second set of parameters.

21. The medium of claim 20 wherein the second set of parameters comprises one or more of a process non-compliance, policy non-compliance, geographical or residential location of candidate, documents submitted by the candidate, or a list of companies or schools confirmed and known to be fraudulent.

22. The medium of claim 21 wherein the second set of parameters includes at least one of default parameters and user modified parameters.

23. The medium of claim 14 further comprising determining a sampling rate for real-time sampling the selected one or more candidates for verifying any fraudulent practices based on the first set of parameters.

24. The medium of claim 23 further comprising refining the sampling rate based on an outcome of the verified fraudulent practices.

25. The medium of claim 14 wherein the one or more prospective candidates comprises one or more of a regular or permanent employee positions, contract employee positions, campus recruited employee positions or lateral employment positions.

26. The medium of claim 14 further comprising displaying a dashboard including the historical data associated with fraudulent practices based on a user request.

27. A talent management computing device comprising:
a processor;
a memory, wherein the memory coupled to the processor which are configured to execute programmed instructions stored in the memory comprising:
selecting one or more prospective candidates from a plurality of candidate e-dossiers stored in a quality talent acquisition database for pre-selection interviews, and wherein the plurality of candidate e-dossiers include job information associated with a plurality of candidates;
obtaining information associated with fraudulent practices used in the pre-selection interviews, storing the obtained information associated with fraudulent practices in the quality talent acquisition database;
selecting one or more candidates for a post-selection process based on an outcome of the pre-selection interviews wherein the post-selection process is a process occurring upon completion of the pre-selection interviews;
compiling the candidate e-dossiers associated with the selected one or more candidates, storing the candidate e-dossiers associated with the selected one or more candidates in the quality talent acquisition database;

updating the candidate e-dossiers associated with the selected one or more candidates using any additional information obtained during the pre-selection interviews;

sampling on a real-time basis using a sampling rate the selected one or more candidates using the updated candidate e-dossiers associated with the selected one or more candidates, historical data associated with fraudulent practices used in the talent acquisition, and an input and trigger based statistical algorithm, wherein the sampling rate is determined based on the updated candidate e-dossiers associated with the selected one more candidates, historical data associated with fraudulent practices used in the talent acquisition, and an input and trigger based statistical algorithm;

verifying any fraudulent practices used in the pre-selection interviews and the post selection process using the updated candidate e-dossiers associated with the sampled and selected one or more candidates, the obtained information associated with fraudulent practices used in the pre-selection interviews, the historical data associated with fraudulent practices used in the talent acquisition to facilitate rapid talent acquisition; and updating the quality talent acquisition database with any fraudulent information found during the verification of any fraudulent practices used in the pre-selection interviews and the post selection process.

28. The device of claim 27 wherein the processor is further configured to execute programmed instructions stored in the memory to generate and send out offers to the sampled and selected one or more candidates based on the outcome of the verification.

29. The device of claim 27 wherein the processor is further configured to execute programmed instructions stored in the memory to:
reconcile discrepancies associated with the randomly sampled candidates verified with any fraudulent practices; and
update the historical data associated with fraudulent practices using the reconciled discrepancies associated with the randomly sampled candidates verified with any fraudulent practices.

30. The device of claim 27 wherein, for the sampling, the processor is further configured to execute programmed instructions stored in the memory to:
obtain a first set of parameters from the updated candidate e-dossiers associated with the selected one or more candidates and the historical data associated with fraudulent practices; and
randomly sample the selected one or more candidates based on the first set of parameters, the historical data associated with fraudulent practices, and the input and trigger based statistical algorithm.

31. The device of claim 30 wherein the first set of parameters comprises one or more of a geographical or residential location of the prospective candidate, source from where the prospective job information was received, prospective candidate referral information, or interviewer information.

32. The device of claim 27 wherein, for the obtaining, the processor is further configured to execute programmed instructions stored in the memory to:
obtain a second set of parameters from the updated candidate e-dossiers associated with the selected one or more candidates and the historical data associated with the fraudulent practices; and
dynamically analyze the job information in the updated candidate e-dossiers associated with the randomly sampled candidates based on the obtained second set of parameters.

33. The device of claim 32 wherein the second set of parameters comprises one or more of a process non-compliance, policy non-compliance, geographical or residential location of candidate, documents submitted by the candidate, or a list of companies or schools confirmed and known to be fraudulent.

34. The device of claim 33 wherein the second set of parameters includes at least one of default parameters and user modified parameters.

35. The device of claim 27 wherein the processor is further configured to execute programmed instructions stored in the memory to determine a sampling rate for real-time sampling the selected one or more candidates for verifying any fraudulent practices based on the first set of parameters.

36. The device of claim 35 wherein the processor is further configured to execute programmed instructions stored in the memory to refine the sampling rate based on an outcome of the verified fraudulent practices.

37. The system of claim 27 wherein the pre-selection interviews comprise interviews comprises a technical interviews and human resource (HR) interviews.

38. The system of claim 27 wherein the one or more prospective candidates comprises one or more of a regular or permanent employee positions, contract employee positions, campus recruited employee positions or lateral employment positions.

39. The system of claim 27 wherein the processor is further configured to execute programmed instructions stored in the memory displaying a dashboard including the historical data associated with fraudulent practices based on a user request.

* * * * *